(12) United States Patent
Seif Tabrizi et al.

(10) Patent No.: US 12,014,247 B2
(45) Date of Patent: Jun. 18, 2024

(54) SYSTEMS AND METHODS FOR COMPRESSED SENSING MEASUREMENT OF LONG-RANGE CORRELATED NOISE

(71) Applicants: University of Maryland, College Park, College Park, MD (US); Government of the United States of America, as Represented by the Secretary of Commerce, Gaithersburg, MD (US)

(72) Inventors: Seyed Alireza Seif Tabrizi, Adelphi, MD (US); Mohammad Hafezi, Washington, DC (US); Yi-Kai Liu, Gaithersburg, MD (US)

(73) Assignees: University of Maryland, College Park, College Park, MD (US); Government of the United States of America, As Represented by the Secretary of Commerce, Gaithersburg, MD (US)

( * ) Notice: Subject to any disclaimer, the term of this patent is extended or adjusted under 35 U.S.C. 154(b) by 28 days.

(21) Appl. No.: 17/743,850

(22) Filed: May 13, 2022

(65) Prior Publication Data
US 2023/0058207 A1 Feb. 23, 2023

Related U.S. Application Data

(60) Provisional application No. 63/188,373, filed on May 13, 2021.

(51) Int. Cl.
*G06N 10/70* (2022.01)

(52) U.S. Cl.
CPC .................... *G06N 10/70* (2022.01)

(58) Field of Classification Search
CPC ..................................................... G06N 10/70
See application file for complete search history.

(56) References Cited

U.S. PATENT DOCUMENTS

| | | | | |
|---|---|---|---|---|
| 11,782,779 | B2 * | 10/2023 | Albert ................. | G06F 11/0751 706/45 |
| 2006/0151775 | A1 * | 7/2006 | Hollenberg ............ | G06N 10/00 257/14 |
| 2019/0049495 | A1 * | 2/2019 | Ofek ..................... | G06F 9/5027 |

(Continued)

OTHER PUBLICATIONS

D. Gross, et al., "Quantum State Tomography via Compressed Sensing", Physical Review Letters 105, 150401, Oct. 8, 2010, pp. 1-4.

(Continued)

*Primary Examiner* — Cynthia Britt
(74) *Attorney, Agent, or Firm* — George Likourezos; Carter, DeLuca & Farrell LLP

(57) ABSTRACT

A method for detecting a two-qubit correlated dephasing error includes accessing a signal of a quantum system, where the quantum system includes a plurality of qubits. Every qubit has a nonzero rate of dephasing and some qubits have a nonzero rate of correlated dephasing. The signal further includes information about a matrix that includes diagonal elements and off-diagonal elements. The off-diagonal elements of the matrix are 2s-sparse. The method further includes performing randomized measurements of the off-diagonal elements of the matrix and recovering the matrix based on a direct measurement of the diagonal elements of the matrix.

17 Claims, 13 Drawing Sheets

(56) References Cited

U.S. PATENT DOCUMENTS

2020/0242500 A1* 7/2020 Girvin .................. G06F 11/322
2020/0334101 A1* 10/2020 Albert ................ G06F 11/0751

OTHER PUBLICATIONS

A. Shabani, et al., "Efficient Measurement of Quantum Dynamics via Compressive Sensing", Physical Review Letters 106, 100401, Mar. 11, 2011, pp. 1-4.
A. Shabani, et al., "Estimation of many-body quantum Hamiltonians via compressive sensing", Physical Review A 84, 012107, pp. 1-8, (2011).
S. T. Flammia, et al., "Quantum tomography via compressed sensing: error bounds, sample complexity and efficient estimators", New Journal of Physics 14, 095022, pp. 1-29, (2012).
I. Roth, et al., "Recovering Quantum Gates from Few Average Gate Fidelities", Phys. Rev. Letter 121, 170502, pp. 1-8, (2018).
R. Harper, et al., "Fast Estimation of Sparse Quantum Noise", PRX Quantum 2, 010322, pp. 1-26, (2021).
D. Suess, et al., "Rapid characterisation of linear-optical networks via PhaseLift", (2020), arXiv preprint 2010.00517, pp. 1-26.

* cited by examiner

| Reconstruction Method | # Measurement Settings $m$ | Sample Complexity |
|---|---|---|
| Naive Method | $O(n^2)$ | $O(n^2)$ |
| CS (RIP-based) | $O(s \log^4 n)$ | $O(s^2 \log^4 n)$ |
| CS (RIPLess) | $O(s \log n)$ | $O(s^4 \log^6 n)$ |

FIG. 7A

| Reconstruction Method: | Naive | CS (RIP-based) | CS (RIPless*) |
|---|---|---|---|
| Single-qubit Spectroscopy | | | |
| # of meas. settings | $n$ | $n$ | $n$ |
| # of samples per setting | $O(n/\delta^2)$ | $O(n/\delta^2)$ | $O(s^3\log^6(n)/\delta^2)$ |
| Total # of samples | $O(n^2/\delta^2)$ | $O(n^2/\delta^2)$ | $o(ns^3\log^6(n)/\delta^2)$ |
| Multi-qubit Spectroscopy | | | |
| # of meas. Settings $m$ | $\propto n^2$ | $\propto s\log^4 n$ | $\propto s\log n$ |
| # of samples per Setting | $O(n/\delta^2)$ | $O(\max(n,s)\log^4(n)/\delta^2)$ | $O(s^2\max(n,s)\log^5(n)/\delta^2)$ |
| Total # of Samples | $O(n^3/\delta^2)$ | $O(s\max(n,s)\log^4(n)/\delta^2)$ | $O(s^3\max(n,s)\log^6(n)/\delta^2)$ |
| Total Sample Complexity | $O(n^3/\delta^2)$ | $O(\max(n,s)^2\log^4(n)/\delta^2)$ | $O(s^3\max(n,s)\log^6(n)/\delta^2)$ |

FIG. 7B

Linear Scaling With s

Log Scaling With n

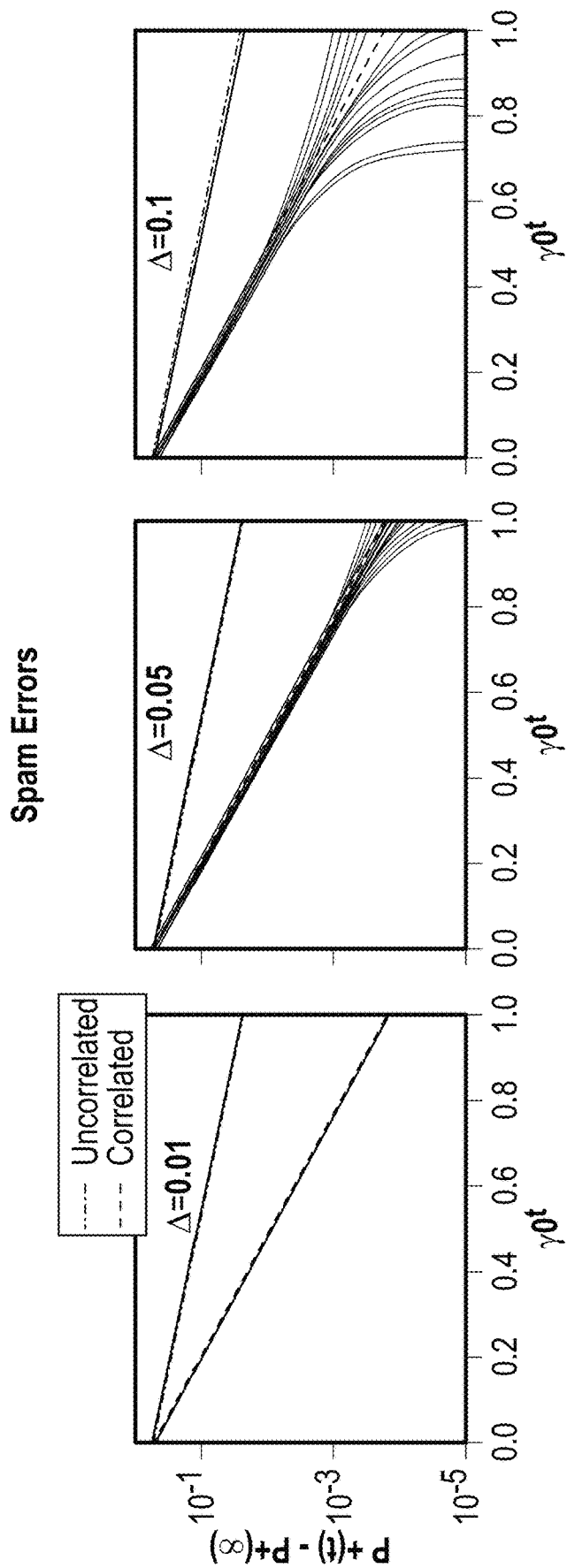

SYSTEMS AND METHODS FOR COMPRESSED SENSING MEASUREMENT OF LONG-RANGE CORRELATED NOISE

CROSS-REFERENCE TO RELATED APPLICATION/CLAIM OF PRIORITY

This application claims the benefit of, and priority to, U.S. Provisional Patent Application No. 63/188,373, filed on May 13, 2021, the entire contents of which are hereby incorporated herein by reference.

GOVERNMENT SUPPORT

This invention was made with government support under W911NF1510397 awarded by the United States Army and under FA95501810161 awarded by the United States Air Force. The government has certain rights in the invention.

TECHNICAL FIELD

The present disclosure relates generally to the field of noisy intermediate-scale quantum information (NISQ) processors. More specifically, an aspect of the present disclosure provides detecting two-qubit correlated dephasing errors in NISQ devices.

BACKGROUND

The development of noisy intermediate-scale quantum information processors (NISQ devices) has the potential to advance many areas of computational science. An important problem is the characterization of noise processes in these devices, in order to improve their performance (via calibration and error correction), and to ensure correct interpretation of the results.

Accordingly, there is interest in improving measurements that have the mathematical properties needed for compressed sensing, and can be implemented efficiently on a quantum device.

SUMMARY

An aspect of the present disclosure provides computer-implemented method for detecting a two-qubit correlated dephasing error. The method includes accessing a signal of a quantum system, where the quantum system includes a plurality of qubits. Every qubit has a nonzero rate of dephasing and some qubits have a nonzero rate of correlated dephasing. The signal includes information about a matrix that includes diagonal elements and off-diagonal elements. The off-diagonal elements of the matrix are 2 s-sparse. The method further includes performing randomized measurements of the off-diagonal elements of the matrix and recovering the matrix based on a direct measurement of the diagonal elements of the matrix.

In accordance with aspects of the disclosure, the method may further include estimating a two-qubit correlated dephasing error based on the recovered matrix.

In an aspect of the present disclosure, performing the randomized measurements may include preparing entangled Greenberger-Horne-Zeilinger states (GHZ states) on random subsets of the plurality of qubits.

In another aspect of the present disclosure, the randomized measurements may be based on noise spectroscopy and quantum sensing.

In yet another aspect of the present disclosure, the recovered matrix may include a restricted isometry property.

In accordance with further aspects of the present disclosure, the method may further include estimating a vector of decay rates that are dependent on the matrix.

In an aspect of the present disclosure, the recovered matrix may be further based on the estimated decay rate.

In another aspect of the present disclosure, the method may further include estimating a relaxation time of the quantum system based on the estimated decay rate.

In yet another aspect of the present disclosure, the method may further include estimating a decoherence time of the quantum system based on the estimated decay rate.

In yet another aspect of the present disclosure, the method may further include detecting a long-range correlated dephasing error based on the recovered matrix.

An aspect of the present disclosure provides a computer-implemented method for detecting a two-qubit correlated dephasing error, the method including: accessing a signal of a quantum system, the signal including a plurality of qubits; dephasing entangled states of the plurality of qubits based on performing Ramsey spectroscopy using entangled states of random subsets of qubits of the plurality of qubits; measuring a linear function of a correlation matrix, where the correlation matrix corresponds to correlated Markovian dephasing between pairs of qubits of the plurality of qubits; generating a first vector and a second vector; and estimating a decay rate based on the first vector and the second vector. A plurality of elements of the first vector and of the second vector are randomly chosen. Every qubit of the plurality of qubits has a nonzero rate of dephasing and some qubits have a nonzero rate of correlated dephasing.

In accordance with further aspects of the present disclosure, the method may further include generating a restricted isometry property-based recovery matrix. The recovery matrix may be further based on the estimated decay rate.

In another aspect of the present disclosure, the method may further include detecting a long-range correlated dephasing error based on the recovery matrix.

In yet another aspect of the present disclosure, the method may further include estimating a relaxation time of the quantum system based on the estimated decay rate.

In a further aspect of the present disclosure, the method may further include estimating a decoherence time of the quantum system based on the estimated decay rate.

An aspect of the present disclosure provides a system for detecting a two-qubit correlated dephasing error, where the system includes: a processor; and a memory, including instructions stored thereon, which when executed by the processor, cause the system to: access a signal of a quantum system, the signal includes a plurality of qubits; and generate a matrix C in $R^{n \times n}$, wherein its off-diagonal part is 2 s sparse. The matrix C is based on the accessed signal. Every qubit has a nonzero rate of dephasing and some qubits have a nonzero rate of correlated dephasing.

In yet a further aspect of the present disclosure, the instructions, when executed by the processor, may further cause the system to perform randomized measurements based on: estimating $(b-a)^T C(b-a)$ for any $a \neq b$ in $\{0,1\}n$; choosing a sequence of random vectors $r(1), \ldots, r(m)$ in $\{1,0,-1\}n$; and estimating $\Phi C = (r^{(1)^\wedge T} C r^{(1)}), \ldots, (r^{(m)^\wedge T} C r^{(m)})$, where $\Phi: R^{n \times n} \to R^m$.

In yet a further aspect of the present disclosure, the instructions, when executed by the processor, may further cause the system to estimate a decay rate $\Gamma_{ab}$ based on any $a \neq b$ in $\{0,1\}^n$, and estimate a decoherence time of the quantum system based on the decay rate $\Gamma_{ab}$.

In an aspect of the present disclosure, the instructions, when executed by the processor, may further cause the system to recover matrix C based on measuring a plurality of diagonal elements of matrix C directly and determining an off-diagonal element of Matrix C based on using $\ell_1$-regularized least-squares regression.

In an aspect of the present disclosure, the instructions, when executed by the processor, may further cause the system to detect a long-range correlated dephasing error based on the recovered matrix C.

Further details and aspects of exemplary embodiments of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative embodiments, in which the principles of the present disclosure are utilized, and the accompanying drawings of which:

FIG. 7A is a table that illustrates sample complexity of different methods for reconstructing the correlation matrix C, in accordance with examples of the present disclosure;

FIG. 7B is a table that illustrates sample complexity of different methods for reconstructing the correlation matrix C, in accordance with examples of the present disclosure;

FIGS. 10A-10C are graphs that illustrate an exponential decay of $\tilde{P}_{ab}(t)$ when there are state-preparation-and-measurement (SPAM) errors for a 3-qubit Greenberger-Horne-Zeilinger (GHZ) state, in accordance with examples of the present disclosure.

DETAILED DESCRIPTION

Figure 1:
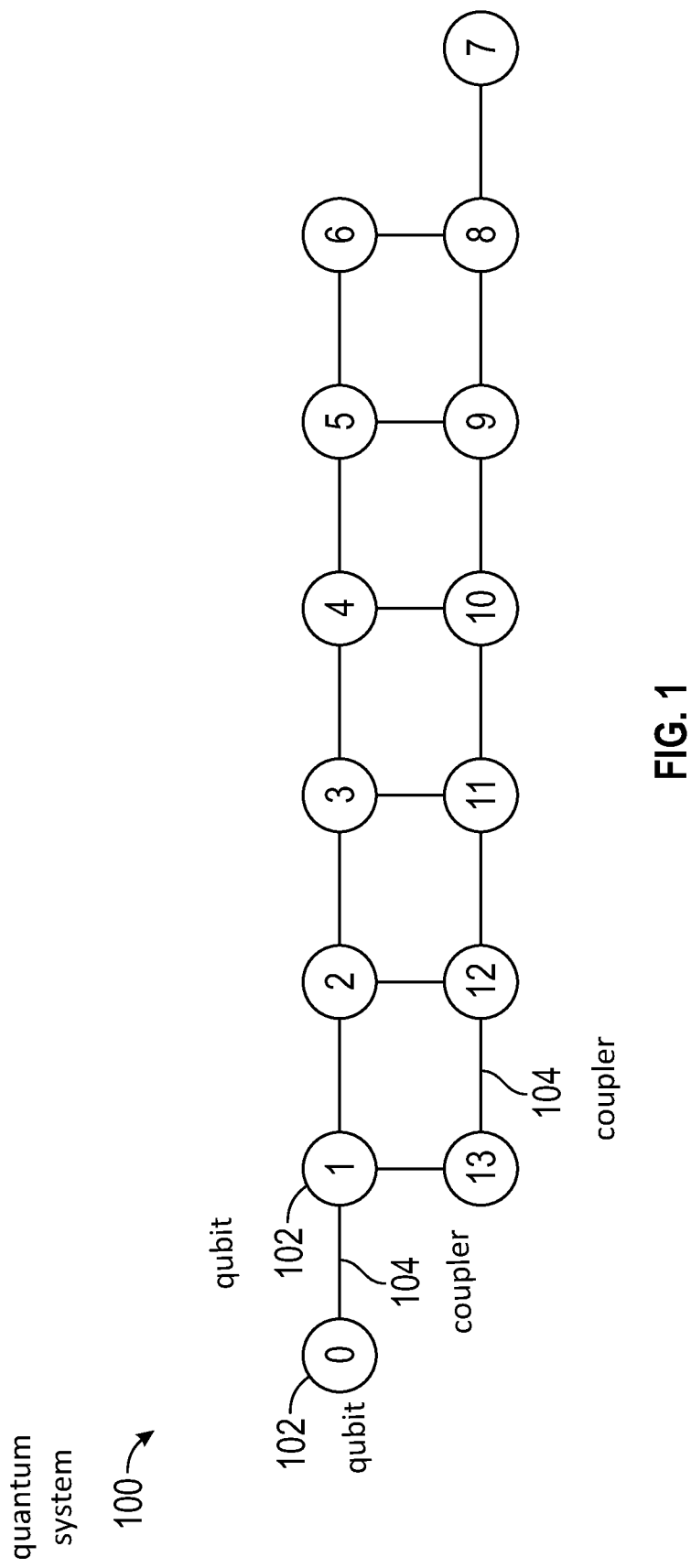
FIG. 1 is a diagram of an exemplary noisy intermediate-scale quantum information (NISQ) processor, in accordance with examples of the present disclosure.

The present disclosure relates generally to the field of noisy intermediate-scale quantum information (NISQ) processors. More specifically, an aspect of the present disclosure provides detecting two-qubit correlated dephasing errors in NISQ devices.

Embodiments of the present disclosure are described in detail with reference to the drawings wherein like reference numerals identify similar or identical elements.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

The notation $x \propto y$ means that x and y are proportional, i.e., $x = cy$ where c is a "universal" constant. A universal constant is a quantity whose value is fixed once and for all, and does not depend on any other variable. Polylogarithmic factors are written in a compact way as follows: $\log^c n = (\log n)^c$. Big-O notation, such as $O(n^3)$, denotes an asymptotic upper bound. Matrices are denoted by capital letters. For a vector v, $\|v\|_p$ denotes the $\ell_p$ norm (in cases where $p=1,2,\infty$). For a matrix M, $\|M\|_F = (\Sigma_{jk}|M_{jk}|^2)^{1/2}$ denotes the Frobenius norm (i.e., the Schatten 2-norm, or the $\ell_2$ norm of the vector containing the entries of M), $\|M\|$ denotes the operator norm (i.e., the Schatten $\infty$-norm), $\|M\|_{tr}$ denotes the trace norm (i.e., the Schatten 1-norm, or the nuclear norm), and $\|M\|_{\ell_1} = \Sigma_{jk}|M_{jk}|$ denotes the $\ell$ norm of the vector containing the entries of M. Given an n×n matrix M, let uvec(M)= $(M_{ij})_{i<j}$ denote the vector (of dimension n(n−1)/2) containing the entries in the upper-triangular part of M, excluding the diagonal. Statistical estimators are written with a hat superscript, e.g., $\hat{\Gamma}$ is a random variable that represents an estimator for some unknown quantity $\Gamma$. For a random variable $\hat{\Gamma}$, $\|\hat{\Gamma}\|_{\psi_2}$ denotes the sub-Gaussian norm, and $\|\hat{\Gamma}\|_{\psi_1}$ denotes the subexponential norm.

The development of noisy intermediate-scale quantum information processors (NISQ devices) has the potential to advance many areas of computational science. An important problem is the characterization of noise processes in these devices, in order to improve their performance (via calibration and error correction), and to ensure correct interpretation of the results. One challenge is to characterize all of the noise processes that are likely to occur in practice, using some experimental procedure that is efficient and can scale up to large numbers of qubits.

Compressed sensing offers one approach to solving this problem, where one uses specially-designed measurements (and classical post-processing) to learn an unknown signal that has some prescribed structure. For example, the unknown signal can be a sparse vector or a low-rank matrix, the measurements can consist of random projections sampled from various distributions, and the classical post-processing can consist of solving a convex optimization problem (e.g., minimizing the $\ell_1$ or trace norm), using efficient algorithms. This approach has been used in several previous works on quantum state and process tomography, and estimation of Hamiltonians and Lindbladians.

From a theoretical perspective, one of the main challenges is to design measurements that have the mathematical properties needed for compressed sensing, and can be implemented efficiently on a quantum device. There has been a substantial amount of work in this area, which can be broadly classified into two approaches: "sparsity-based" and "low-rank" compressed sensing. For compressed sensing of "low-rank" objects (e.g., low-rank density matrices and quantum processes), there seems to be a few natural choices for measurements, including random Pauli measurements, and fidelities with random Clifford operations. For compressed sensing of "sparse" objects (e.g., sparse Hamiltonians, Lindbladians, or Pauli channels), however, the situation is more complicated, as a larger number of different measurement schemes and classical post-processing methods have been proposed, and the optimal type of measurement seems to depend on the situation at hand. This complicated state of affairs can be explained in part because "sparsity" occurs in a wider variety of situations than "low-rankness."

Long-range correlated errors can severely impact the performance of NISQ (noisy intermediate-scale quantum) devices, and fault-tolerant quantum computation. Characterizing these errors is important for improving the performance of these devices, via calibration and error correction, and to ensure correct interpretation of the results. A compressed sensing method for detecting two-qubit correlated dephasing errors may be used for characterizing these errors, assuming only that the correlations are sparse (i.e., at most s pairs of qubits have correlated errors, where s<<n(n−1)/2, and n is the total number of qubits). In particular, the disclosed method can detect long-range correlations between any two qubits in the quantum system (i.e., the correlations are not restricted to be geometrically local).

The disclosed method is highly scalable, because the disclosed method requires as few as m∝s log n measurement settings (where ∝ denotes proportionality), and efficient classical post-processing based on convex optimization. In addition, when m∝s $\log^4$n, the disclosed method is highly robust to noise, and has sample complexity O(max(n, s)$^2$ $\log^4$(n)), which can be compared to conventional methods that have sample complexity O(n$^3$). Thus, the disclosed method is advantageous when the correlations are sufficiently sparse, that is, when s≤O(n$^{3/2}$/$\log^2$n). The disclosed method also performs well in numerical simulations on small quantum system sizes, and has some resistance to state-preparation-and-measurement (SPAM) errors. A feature of the disclosed method is a new type of compressed sensing measurement, which works by preparing entangled Greenberger-Horne-Zeilinger states (GHZ states) on random subsets of qubits, and measuring their decay rates with high precision.

Characterizing errors when building large-scale quantum devices is needed for calibrating, correcting the errors, and interpreting the result of the quantum devices correctly. For example, quantum simulations have only a limited simulation time. Metrology and quantum sensing may lead to reduced sensitivity, while error correction and fault tolerance require increased overhead.

Thus, there is a need to find methods for characterizing all the likely noise processes in quantum systems that are efficient and scalable.

Referring to FIG. 1, a diagram of an example quantum system 100, is shown. The quantum system 100 may include, for example, a NISQ (noisy intermediate-scale quantum) device (i.e., a NISQ processor). The term "noisy" refers to the fact that quantum processors are very sensitive to the environment and may lose their quantum state due to quantum decoherence (i.e., dephasing). The quantum system 100 includes qubits 102 which are linked by a coupler 104. The qubits are the quantum version of classic binary bits realized with a two-state quantum-mechanical system. The coupler 104, for example, may be implemented by connecting the two qubits to an intermediate electrical coupling circuit. The circuit might be a fixed element, such as a capacitor, or a controllable element. It is contemplated that the quantum system 100 may include any suitable number of qubits 102 and/or couplers 104.

The theory of "sparsity-based" quantum compressed sensing may be applied to a physical problem that is relevant to the development of quantum system 100 (e.g., a NISQ device), such as detecting long-range correlated dephasing errors. A simple model of correlated dephasing, is described by the following Markovian master equation:

$$\frac{d\rho}{dt} = \mathcal{L}(\rho) = \sum_{j,k=1}^{n} c_{jk}\left(Z_k\rho Z_j - \frac{1}{2}\{Z_jZ_k, \rho\}\right).$$

Here the quantum system 100 consists of n qubits, and $Z_j$ and $Z_k$ are Pauli $\sigma_z$ operators that act on the j'th and k'th qubits, respectively. The noise is then completely described by the correlation matrix C=$(c_{jk})\in \mathbb{R}^{n\times n}$. (See FIGS. 3 and 6.) Generalizations of this model with complex coefficients $c_{jk}$, and an additional environment-induced Hamiltonian are considered.

Here, the diagonal elements $c_{jj}$ show the rates at which single qubits dephase, and the off-diagonal elements $c_{jk}$ show the rates at which pairs of qubits undergo correlated dephasing. Typically, the diagonal of C will be nonzero, while the off-diagonal part may be dense or sparse, depending on the degree of connectivity between the qubits and their environment.

This master equation describes a number of physically plausible scenarios, such as spin-½ particles coupling to a shared bosonic bath. It has also been studied as an example of how collective decoherence can affect physical implementations of quantum computation and quantum sensing.

This model of correlated dephasing is quite different from other models of crosstalk that are based on quantum circuits or Pauli channels. The disclosed model describes crosstalk that arises from the physical coupling of the qubits to their shared environment. The disclosed model has a different character from crosstalk that arises from performing imperfect two-qubit gates, or correlated errors that result when the physical noise processes are symmetrized by applying quantum operations such as Pauli twirls.

The disclosed model of correlated dephasing can be learned efficiently when the off-diagonal part of the correlation matrix C is sparse. It is assumed that C has at most s<<n(n−1)/2 nonzero entries above the diagonal, but these entries may be distributed arbitrarily; in particular, long-range correlated errors are allowed. (Note that physical constraints imply that C is positive semidefinite, hence $C=C^\dagger$)

The fact that the disclosed model enables long-range correlations is quite powerful, and is relevant to a number of interesting settings in quantum information science. These settings include experimental NISQ devices, which are often engineered to have long-range interactions, in order to perform quantum computations more efficiently; the execution of quantum circuits on distributed quantum computers, where long-range correlations are generated when qubits are moved or teleported from one location to another; and quantum sensor arrays, where a detection event at an arbitrary location (j,k) in the array may be registered as a pairwise correlation between a qubit that is coupled to row j and a qubit that is coupled to column k in the array.

Figure 2:
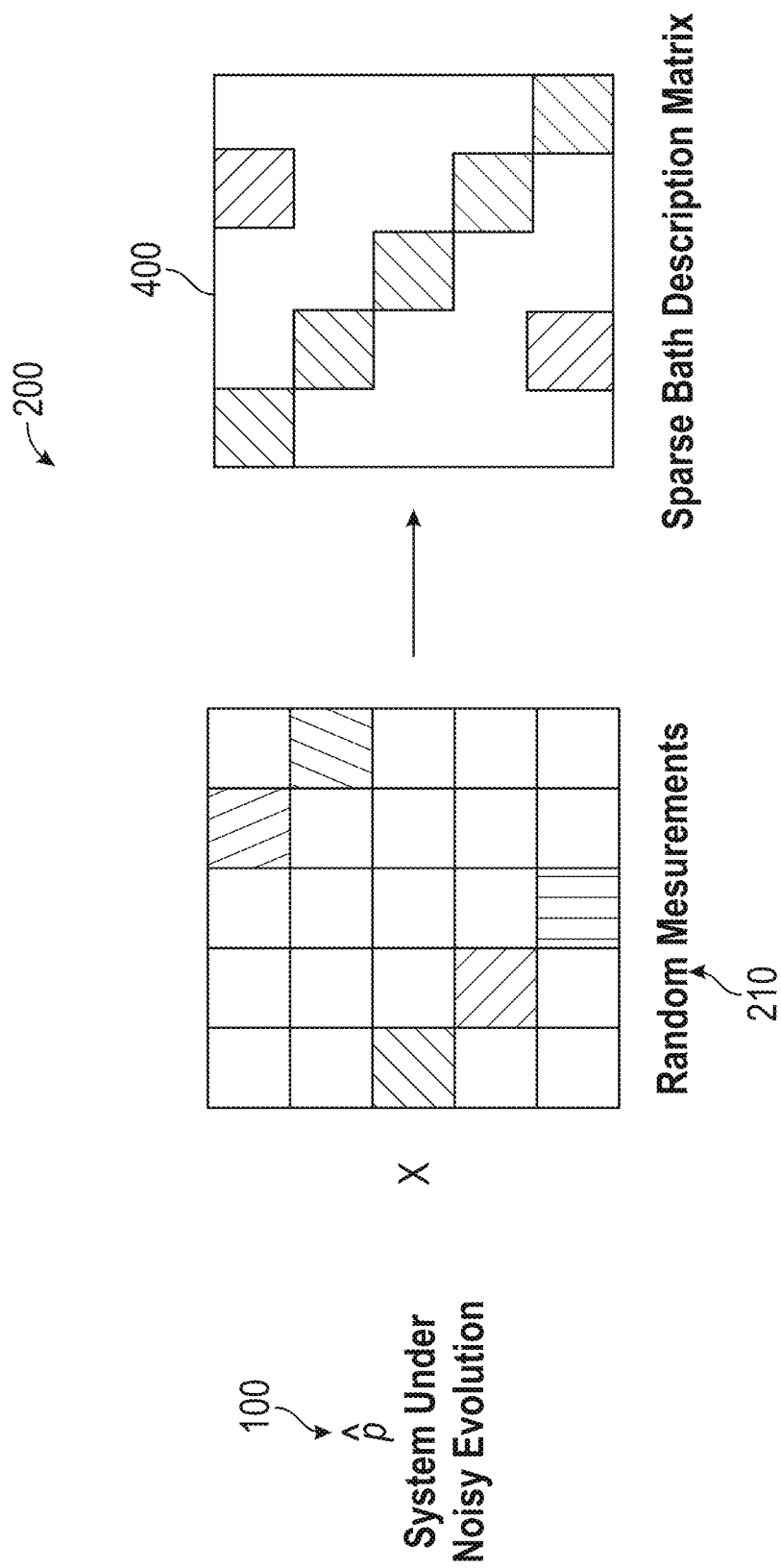
FIG. 2 is a high level flow diagram of the computer-implemented method for detecting a two-qubit correlated dephasing error, in accordance with examples of the present disclosure.
Figure 4:
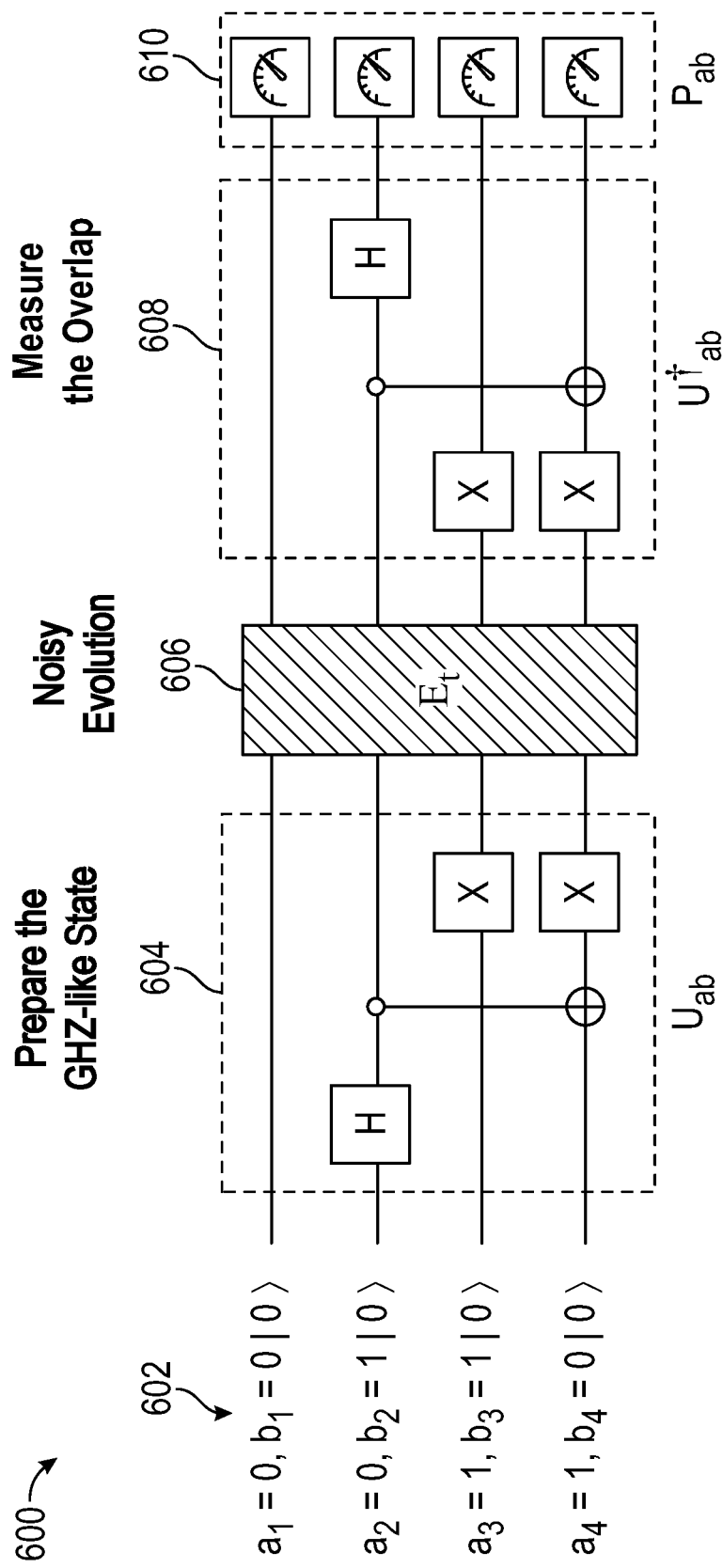
FIG. 4 illustrates a flow diagram of the computer-implemented method 600 for determining a two-qubit correlated dephasing error for the quantum system 100, such as the quantum system of FIG. 1, in accordance with examples of the present disclosure.

Referring to FIG. 2 a high level flow diagram of a computer-implemented method 200 for detecting a two-qubit correlated dephasing error is shown. A quantum system 100 such as a NISQ device is observed under noisy evolution 606 (FIG. 4). Random measurements 210 (e.g., Ramsey spectroscopy, FIG. 5) are made and a sparse correlation matrix C 400 (FIG. 6) is characterized based on the random measurements 210. The correlation matrix C 400 corresponds to correlated Markovian dephasing between pairs of qubits.

Figure 3:
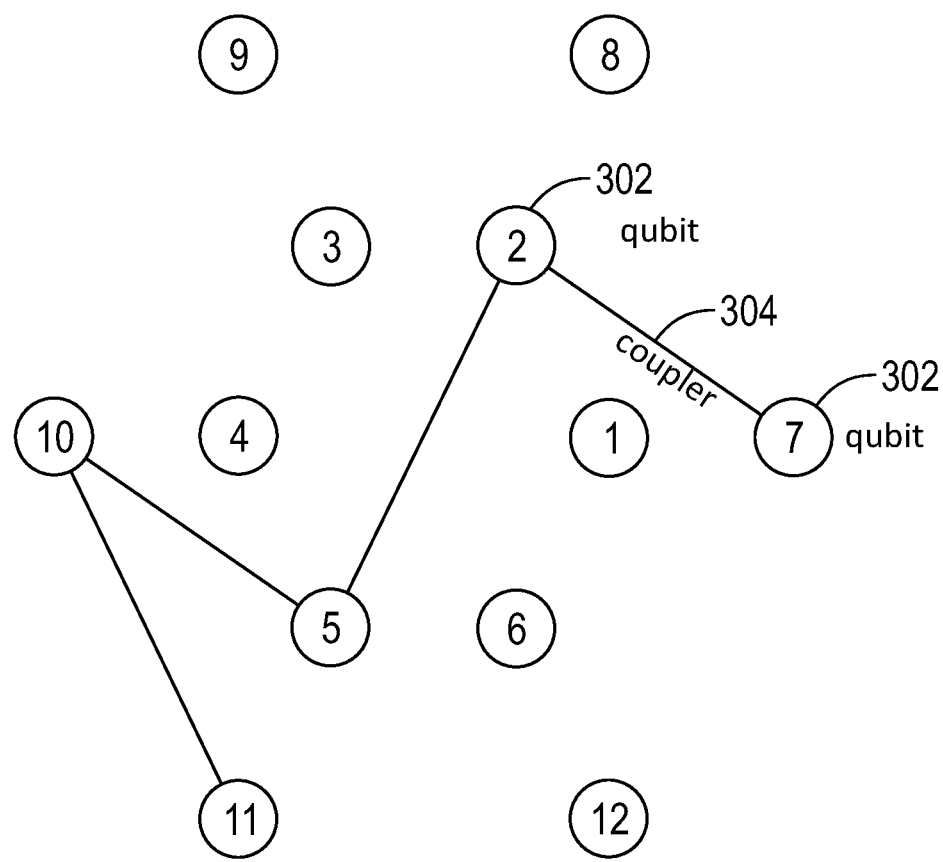
FIG. 3 is a correlation graph of a noise model of the quantum system of FIG. 1, in accordance with examples of the present disclosure.

Referring to FIG. 3 an illustration of a correlation graph of a noise model 300 of the quantum system 100 of FIG. 1 is shown. The qubits 302 experience correlated Markovian dephasing. Non-zero $c_{ij}$ are shown, indicating correlated noise affecting the pairs of qubits connected by the lines 304.

FIG. 4 illustrates a computer-implemented method 600 for determining a two-qubit correlated dephasing error for the quantum system 100, such as the quantum system of FIG. 1. Initially, a general form of Ramsey spectroscopy using entangled states on multiple qubits is described. A simple method for directly measuring the correlation matrix C 400, by performing spectroscopy on every pair of qubits is described. This simple method serves as a baseline for measuring the performance of the disclosed compressed sensing method. It is contemplated that the disclosed methods may be performed by a processor and memory. The memory may include instructions thereon, which are executed by the processor.

Initially, a signal is accessed from a quantum system 100. The quantum system 100 contains a plurality of qubits, every qubit has a nonzero rate of dephasing, and some pairs of qubits have a nonzero rate of correlated dephasing. At step 602, vectors a and b whose elements are randomly chosen from {0,1} are generated. At step 604, the operation $U_{ab}$ prepares the state $$\frac{1}{\sqrt{2}}(|a\rangle + |b\rangle).$$

At step bub the quantum system 100 evolves under dephasing noise for time t, represented by $\varepsilon_t$. At step 608, $U_{ab}^\dagger$ is applied and a computational basis measurement is performed. The probability of obtaining the outcome 0, $P_{ab}$, decays exponentially (towards ½) as t increases. At step 610, matrix C 400 (FIG. 6) may be recovered by measuring the decay rate $\Gamma_{ab}$ for various a's and b's.

Here it is assumed that the entries in the matrix C 400 are real (i.e., with imaginary part equal to zero). This holds true in a number of cases, for instance, when the qubits are coupled to a bath at a high temperature. When C is complex, it can be handled using a generalization of the disclosed method. Note that physical constraints imply that C is positive semidefinite; hence $C=C^T$ in the real case, and $C=C^\dagger$ in the complex case.

In aspects, the entangled states may undergo dephasing. The following procedure enables the measurement of certain linear functions of the correlation matrix C 400. This procedure is very general, and includes single- and two-qubit Ramsey spectroscopy as special cases. Consider an n-qubit state of the form $$|\psi_{ab}\rangle = \frac{1}{\sqrt{2}}(|a\rangle + |b\rangle) \in (\mathbb{C}^2)^{\otimes n}, \tag{Eq. 2.1}$$

where a, b $\in \{0,1\}^n$, a≠b, $|a\rangle = |a_1, a_2, \ldots, a_n\rangle$ and $|b\rangle = |b_1, b_2, \ldots, b_n\rangle$. By choosing a and b appropriately, one can make $|\psi_{ab}\rangle$ be a single-qubit $|+\rangle$ state, a two-qubit Bell state, or a many-qubit Greenberger-Horne-Zeilinger state (GHZ state) (while the other qubits are in a tensor product of $|0\rangle$ and $|1\rangle$ states).

For example, the state $|\psi_{ab}\rangle$ may be prepared, the state may be allowed to evolve for time t under the Lindbladian (Eq. 1.1). $\rho(t)$ is the resulting density matrix. As can be seen in Eq. (1.2), the coherences (that is, the off-diagonal elements $|a\rangle\langle b|$) of $\rho(t)$ decay as $\exp(-\Gamma_{ab}t)$, where the decay rate $\Gamma_{ab} \in \mathbb{R}$ is defined so that $\mathcal{L}(|a\rangle\langle b|) = -\Gamma_{ab}|a\rangle\langle b|$. This decay rate can be estimated by allowing the quantum system 100 to evolve for a suitable amount of time t, and then measuring in the basis $$\frac{1}{\sqrt{2}}(|a\rangle + |b\rangle).$$

The decay rate $\Gamma_{ab}$ shows a certain linear function of the correlation matrix C, which can be written explicitly as follows. Let $\alpha_i=(-1)^{a_i}$ and $\beta_i=(-1)^{b_i}$ denote the expectation values of $Z_i$ corresponding to the states $|a\rangle$ and $|b\rangle$, respectively. In addition, define the vectors $\alpha=(\alpha_1, \ldots, \alpha_n)$ and $\beta=(\beta_1, \ldots, \beta_n)$.

$$\Gamma_{ab} = -\sum_{ij} c_{ij}\left[\alpha_i\beta_j - \frac{1}{2}\alpha_i\alpha_j - \frac{1}{2}\beta_i\beta_j\right] \tag{Eq. 2.2}$$

$$= 2r^T C r, \tag{Eq. 2.3}$$

Recall the definition of r, r=b−a, (Eq. 2.4) note that $$r = \frac{\alpha - \beta}{2},$$

and the fact that $C=C^T$ is used to symmetrize the equation.

Single-qubit Ramsey spectroscopy (FIG. 4) is a special case of this procedure, where a=(0, 0, . . . , 0) and b=(0, . . . , 0,1,0, . . . , 0) (where the 1 appears in the j'th position). Then $|\psi_{ab}\rangle$ is a $|+\rangle$ state on the j'th qubit, and $\Gamma_{ab}=2c_{jj}$ tells the rate of dephasing on the j'th qubit.

Two-qubit generalized spectroscopy is another special case, where $a=(0, 0, \ldots, 0)$ and $b=(0, \ldots, 0,1,0, \ldots, 0,1,0, \ldots, 0)$ (where the 1's appear in the j'th and k'th positions). Then $|\psi_{ab}\rangle$ is a maximally-entangled state on qubits j and k, and $\Gamma_{ab}=2(c_{jj}+c_{jk}+c_{kj}+c_{kk})$ provides information about the rate of correlated dephasing on qubits j and k.

An advantage of the disclosed methods is that the methods enable the characterization of errors. The characterized errors may be used to improve quantum systems (and devices) to reduce errors. For example, errors may be mitigated by applying a gate opposite to the characterized error. In another example, there are many quantum systems 100 that include a master clock, that is configured to track the phase of all of the qubits, so if dephasing occurs, the system loses the ability to track the phase of the qubits. The disclosed methods enable mitigation of the dephasing error based on the characterized error.

Figure 5:
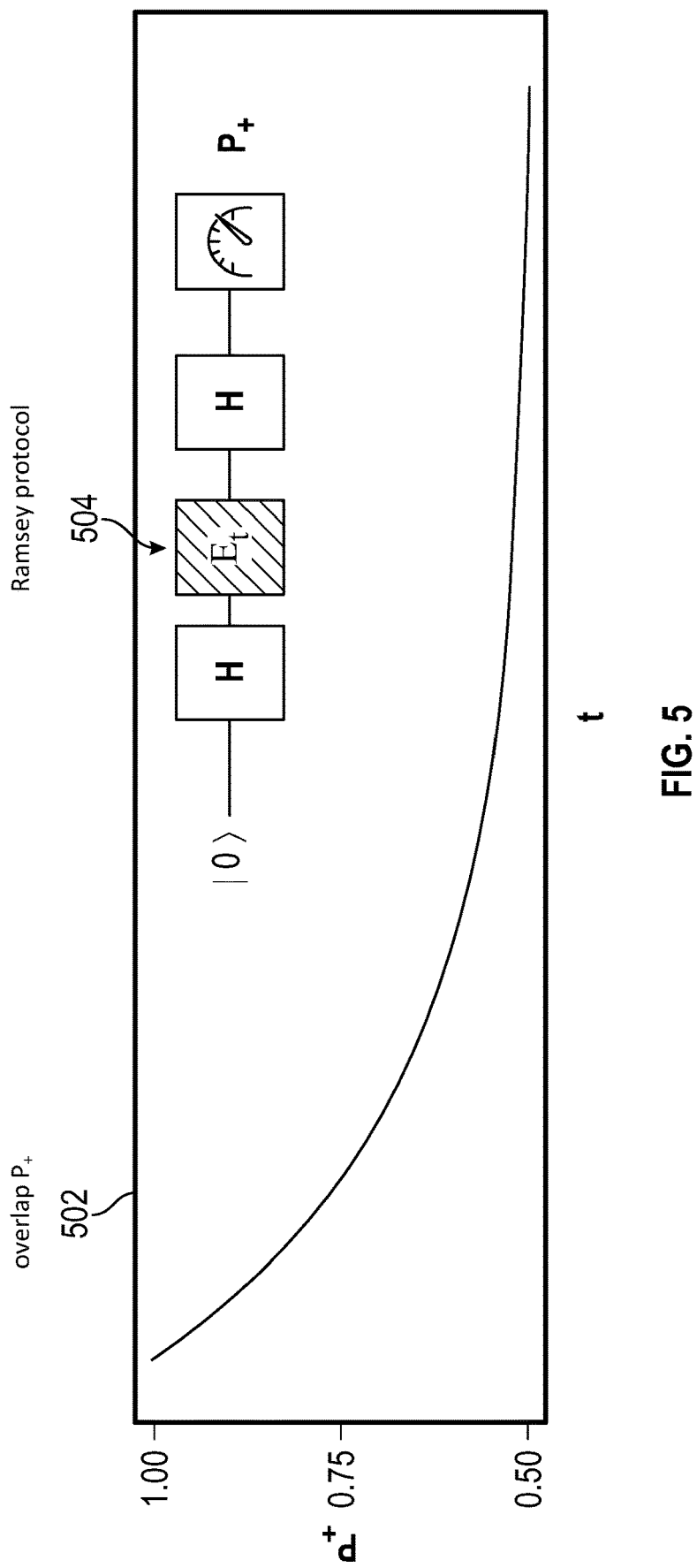
FIG. 5 is a graph that illustrates single qubit Ramsey spectroscopy, in accordance with examples of the present disclosure.

FIG. 5 is a graph that illustrates single qubit Ramsey spectroscopy. Ramsey spectroscopy is a form of particle interferometry that uses the phenomenon of magnetic resonance to measure transition frequencies of particles. The plot 502 shows the overlap $P_+$, which decays exponentially (towards ½) with decay rate $\Gamma$, as a function of time t. The inset block diagram 504 illustrates the Ramsey protocol, where a superposition of qubit states is prepared with the first Hadamard gate H, the quantum system 100 undergoes dephasing (represented by the noise channel $\varepsilon_t$) for time t, and the second H followed by a measurement in the computational basis measures the overlap $P_+$.

In aspects, the decay rate $\Gamma_{ab}$ may be estimated by:
1. Choosing some evolution time $t \geq 0$ such that $$\frac{1}{2} \leq \Gamma_{ab} t \leq 2.$$

This can be done in various ways, for instance, by starting with an initial guess $t=\tau_0$ and performing binary search, using $\sim |\log(\Gamma_{ab}\tau_0)|$ trials of the experiment.

2. Repeating the following experiment $N_{trials}$ times: ($N_{trials}$ may be set using equation (2.11) below)
(a) Preparing the state $$|\psi_{ab}\rangle = \frac{1}{\sqrt{2}}(|a\rangle + |b\rangle),$$

allow the state to evolve for time t, then measure in the basis $$\frac{1}{\sqrt{2}}(|a\rangle + |b\rangle).$$

Letting $N_+$ and $N_-$ be the number of $$\frac{1}{\sqrt{2}}(|a\rangle + |b\rangle) \text{ and } \frac{1}{\sqrt{2}}(|a\rangle + |b\rangle)$$

outcomes, respectively. Note that the probabilities of these outcomes are given by $$P_+ = \frac{1}{2}(1 + e^{-\Gamma_{ab}t}) \text{ and } P_- = \frac{1}{2}(1 - e^{-\Gamma_{ab}t}).$$

3. Defining:

$$\Delta = \frac{N_+ - N_-}{N_{trials}}. \tag{Eq. 2.5}$$

Note that $\Delta$ is an unbiased estimator for $P_+ - P_-$, that is, $\mathbb{E}(\Delta) = P_+ - P_- = e^{-\Gamma_{ab}t}$. This motivates the definition of an estimator for $\Gamma_{ab}$:

$$\hat{\Gamma}_{ab} = -\frac{1}{t}\ln(\Delta). \tag{Eq. 2.6}$$

Next, some bounds on the accuracy of the estimator $\hat{\Gamma}_{ab}$ may be set. To do this, the notion of a sub-Gaussian random variable is introduced (e.g., a random variable whose moments and tail probabilities behave like those of a Gaussian distribution). A real-valued random variable X is sub-Gaussian if there exists a real number $K_2$ such that, for all $p \geq 1$, $(\mathbb{E}(|X|^p))^{1/p} \leq K_2 \sqrt{p}$. (Eq. 2.7)

The sub-Gaussian norm of X, denoted $\|X\|_{\psi_2}$, is defined to be the smallest choice of $K_2$ in (2.7), i.e., $$\|X\|_{\psi_2} = \sup_{p \geq 1} p^{-1/2} (\mathbb{E}(|X|^p))^{1/p}. \tag{Eq. 2.8}$$

In addition, it is known that X is sub-Gaussian if and only if there exists a real number $K_1$ such that, for all $t \geq 0$, $\Pr[|X| > t] \leq \exp(1 - t^2/K_1^2)$. (Eq. 2.9)

The smallest choice of $K_1$ in (Eq. 2.9) is equivalent to the sub-Gaussian norm $\|X\|_{\psi_2}$, in the following sense: there is a universal constant c such that, for all sub-Gaussian random variables X, the smallest choice of $K_1$ in (Eq. 2.9) differs from $\|X\|_{\psi_2}$ by at most a factor of c.

$\hat{\Gamma}_{ab} - \Gamma_{ab}$ is a sub-Gaussian random variable, whose sub-Gaussian norm is bounded by $$\|\hat{\Gamma}_{ab} - \Gamma_{ab}\|_{\psi_2} \leq C_0 \frac{\Gamma_{ab}}{\sqrt{N_{trials}}}, \tag{Eq. 2.10}$$

where $C_0$ is a universal constant (e.g., $1/\sqrt{N_{trials}}$). In particular, the accuracy of $\hat{\Gamma}_{ab}$ can be controlled by setting N trials appropriately: for any $\delta > 0$ and $\epsilon > 0$, where $$N_{trials} \geq \frac{2}{\delta^2} \ln\left(\frac{2}{\epsilon}\right), \tag{Eq. 2.11}$$

then $\hat{\Gamma}_{ab}$ satisfies the following error bound: with probability at least $1-\epsilon$, $|\hat{\Gamma}_{ab} - \Gamma_{ab}| \leq 2 \delta e^2 \Gamma_{ab}$. (Eq. 2.12)

This shows that the error in $\hat{\Gamma}_{ab}$ is at most a small fraction of the true value of $\Gamma_{ab}$, independent of the magnitude of $\Gamma_{ab}$.

In aspects, this may derive an error bound that involves $\hat{\Gamma}_{ab}$ rather than $\Gamma_{ab}$, and may be computed from the observed value of $\hat{\Gamma}_{ab}$. To show such an error bound, the triangle inequality may be used to write $|\hat{\Gamma}_{ab} - \Gamma_{ab}| \leq 2\delta e^2 (|\hat{\Gamma}_{ab}| + |\hat{\Gamma}_{ab} - \Gamma_{ab}|)$, and divide by $(1 - 2\delta e^2)$ to obtain:

$$|\hat{\Gamma}_{ab} - \Gamma_{ab}| \leq \frac{2\delta e^2}{1 - 2\delta e^2} |\hat{\Gamma}_{ab}|. \tag{Eq. 2.13}$$

It remains to prove (Eq. 2.10) and (Eq. 2.12). First use Hoeffding's inequality to show that $\Delta$ is close to its expectation value: $Pr[|\Delta-(P_+-P_-)|\geq\delta]\leq 2 \exp(-N_{trials}\delta^2/2)$. (Eq. 2.14)

When $|\Delta-(P_+-P_-)|\leq\delta$, the error in $\hat{\Gamma}_{ab}$ may be bounded as follows: (using the fact that $P_+-P_-=e^{-\Gamma_{ab}t}\geq e^{-2}$ and $$t \geq \frac{1}{2\Gamma_{ab}})$$

$$-\hat{\Gamma}_{ab} \leq \frac{1}{t}\ln(P_+ - P_- + \delta) \quad \text{(Eq. 2.15)}$$

$$\leq \frac{1}{t}\left[\ln(P_+ - P_-) + \delta e^2\right]$$

$$\leq -\Gamma_{ab} + 2\Gamma_{ab}\delta e^2,$$

$$-\hat{\Gamma}_{ab} \geq \frac{1}{t}\ln(P_+ - P_- - \delta) \quad \text{(Eq. 2.16)}$$

$$\geq \frac{1}{t}\left[\ln(P_+ - P_-) - \delta e^2\right]$$

$$\geq -\Gamma_{ab} - 2\Gamma_{ab}\delta e^2.$$

Thus:

$$Pr[|\hat{\Gamma}_{ab}-\Gamma_{ab}|\geq 2\delta e^2\Gamma_{ab}]\leq 2 \exp(-N_{trials}\delta^2/2). \quad \text{(Eq. 2.17)}$$

(Eq. 2.17) implies (Eq. 2.10) and (Eq. 2.12).

Figure 6:
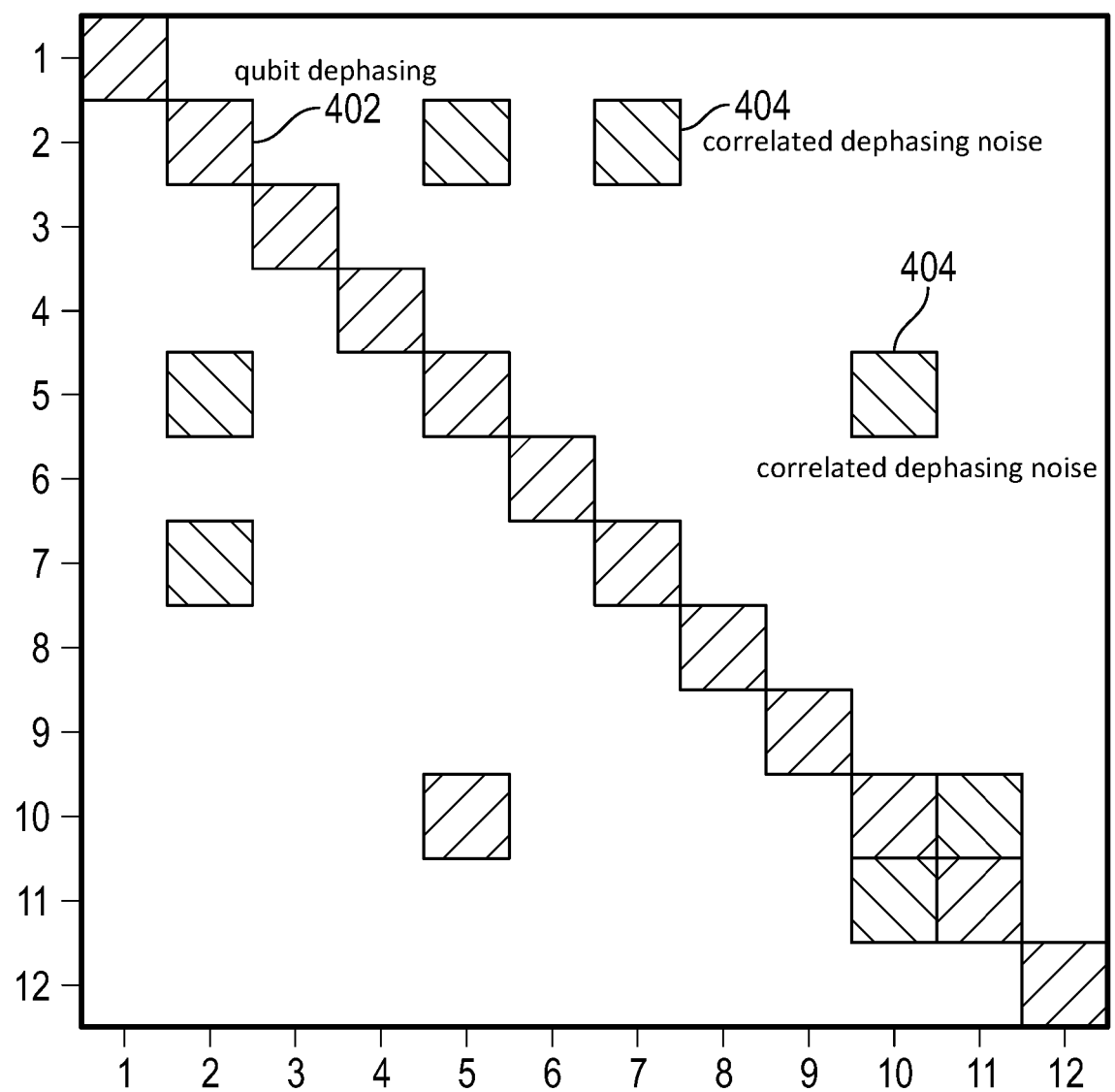
FIG. 6 is a correlation matrix C corresponding to the correlation graph of FIG. 3, in accordance with examples of the present disclosure.

Referring to FIG. 6, matrix C 400 corresponding to the correlation graph in FIG. 3 is shown. The diagonal elements correspond to single qubit dephasing 402. The off-diagonal elements indicate correlated dephasing noise 404. In aspects, a direct estimation of the correlation matrix C 400 may be performed. The correlation matrix C 400 may be estimated directly, by performing single-qubit spectroscopy to measure the diagonal elements $c_{jj}$, and by performing two-qubit spectroscopy to measure the off-diagonal elements $c_{jk}$. This method may be used as a baseline to measure the performance of the disclosed compressed sensing method.

For simplicity, the case where C is real is considered. Since C is positive definite, this implies that $c_{jj}\geq 0$ and $c_{jk}=c_{kj}$.

First, the diagonal elements $c_{jj}$, for $j=1, n$, are estimated as follows:

1. Let $a=(0, 0, \ldots, 0)$ and $b=(0, \ldots, 0,1,0, \ldots, 0)$ (where the 1 appears in the j'th position).
2. Construct an estimate $\hat{\Gamma}_{ab}$ of the decay rate $\Gamma_{ab}=2c_{jj}$. Define $g_j=\hat{\Gamma}_{ab}/2$.

To write this in a compact form, define $\text{diag}(C)=(c_{11}, \ldots, c_{nn})$, (Eq. 2.18)
that is, the diagonal of C. Next, define $g=(g_1, \ldots, g_n)$, (Eq. 2.19)

This is viewed as an estimator for $\text{diag}(C)$.

Next, the off-diagonal elements $c_{jk}$, for $1\leq j<k\leq n$, are estimated as follows:

1. Let $a=(0, 0, \ldots, 0)$ and $b=(0, \ldots, 0, 1, 0, \ldots, 0, 1, 0, \ldots, 0)$ (where the 1's appear in the j'th and k'th positions).
2. Construct an estimate $\hat{\Gamma}_{ab}$ of the decay rate $\Gamma_{ab}=2(c_{jj}+2c_{jk}+c_{kk})$ and define $$h_{jk} = \frac{1}{4}\hat{\Gamma}_{ab} - \frac{1}{2}g_j - \frac{1}{2}g_k.$$

To write this in a compact form, define C' to be the matrix C 400 with the diagonal entries replaced by zeros, $$C'_{jk} = \begin{cases} c_{jk} & \text{if } j \neq k, \\ 0 & \text{if } j = k. \end{cases} \quad \text{(Eq. 2.20)}$$

The "off-diagonal portion" of matrix C is 2 s sparse. An estimator for $\hat{C}'$ is constructed, as follows:

$$\hat{C}'_{jk} = \begin{cases} h_{jk} & \text{if } j < k, \\ h_{kj} & \text{if } j > k, \\ 0 & \text{if } j = k. \end{cases} \quad \text{(Eq. 2.21)}$$

The accuracy of these estimators may be analyzed as follows. Initially, two parameters $\delta_1$ and $\delta_2$ are chosen. Suppose that, during the measurement of the diagonal elements $c_{jj}$, the decay rates $\Gamma_{ab}$ are estimated with accuracy $\|\hat{\Gamma}_{ab}-\Gamma_{ab}\|_{\psi_2}\leq\delta_1\Gamma_{ab}$, (Eq. 2.22) and during the measurement of the off-diagonal elements $c_{jk}$, the decay rates $\Gamma_{ab}$ are estimated with accuracy $\|\hat{\Gamma}_{ab}-\Gamma_{ab}\|_{\psi_2}\leq\delta_2\Gamma_{ab}$. ($\Gamma_{ab}$ (Eq. 2.23).

Bounds of the form (Eq. 2.22) and (Eq. 2.23) can be obtained from equation (Eq. 2.10), by setting $N_{trials}\sim 1/\delta_1^2$ and $N_{trials}\sim 1/\delta_2^2$, respectively. Counting those trials of the experiment that are used to choose the evolution time t may be neglected, because the number of those trials grows only logarithmically with $\Gamma_{ab}$. $\delta_1$ and $\delta_2$ may be different, because in many experimental scenarios, measurements of $c_{jj}$ take less time than measurements of $c_{jk}$. Using (Eq. 2.22) and (Eq. 2.23), it can be shown that bounds on the accuracy of $g_j$ and $h_{jk}$ are:

$$\|g_j - c_{jj}\|_{\psi_2} \leq \delta_1 c_{jj}, \quad \text{(Eq. 2.24)}$$

$$\|h_{jk} - c_{jk}\|_{\psi_2} \leq \delta_2 c_{jk} + \frac{1}{2}(\delta_1 + \delta_2)(c_{jj} + c_{kk}). \quad \text{(Eq. 2.25)}$$

These bounds on the sub-Gaussian norm imply bounds on the moments, such as $\mathbb{E}|X|\leq\|X\|_{\psi_2}$ and $\mathbb{E}(X^2)\leq 2\|X\|_{\psi_2}^2$.

The results to bound the accuracy of the estimators g and $\hat{C}'$ may be followed. For g, using the $\ell_1$ and $\ell_2$ norms, the bounds are:

$$\mathbb{E}(\|g-\text{diag}(C)\|_1)\leq\delta_1\|\text{diag}(C)\|_1, \quad \text{(Eq. 2.26)}$$

$$\mathbb{E}(\|g-\text{diag}(C)\|_2^2)\leq 2\delta_1^2\|\text{diag}(C)\|_2^2. \quad \text{(Eq. 2.27)}$$

For $\hat{C}'$, using the $\ell_1$ vector norm and the Frobenius matrix norm, the bounds are:

$$\mathbb{E}\left(\|\hat{C}' - C'\|_{\ell_1}\right) \leq 2\sum_{j<k}\left(\delta_2 c_{jk} + \frac{1}{2}(\delta_1 + \delta_2)(c_{jj} + c_{kk})\right) = \quad \text{(Eq. 2.28)}$$

$$\delta_2\sum_{j\neq k} c_{jk} + \frac{1}{2}(\delta_1 + \delta_2)\sum_{j\neq k}(c_{jj} + c_{kk}) \leq$$

$$(n-1)(\delta_1 + \delta_2)\|\text{diag}(C)\|_{\ell_1} + \delta_2\|C'\|_{\ell_1},$$

$$\mathbb{E}\left(\|\hat{C}' - C'\|_F^2\right) \leq 2\sum_{j<k} 2\left[\delta_2 c_{jk} + \frac{1}{2}(\delta_1 + \delta_2)(c_{jj} + c_{kk})\right]^2 \leq \quad \text{(Eq. 2.29)}$$

$$2\sum_{j<k} 6\left[\delta_2^2 c_{jk}^2 + \frac{1}{4}(\delta_1 + \delta_2)^2 c_{jj}^2 + \frac{1}{4}(\delta_1 + \delta_2)^2 c_{kk}^2\right] \leq$$

$$6\delta_2^2\|C'\|_F^2 + \frac{3}{2}(\delta_1 + \delta_2)^2\sum_{j\neq k}(c_{jj}^2 + c_{kk}^2) \leq$$

$$3(n-1)(\delta_1 + \delta_2)^2\|\text{diag}(C)\|_2^2 + 6\delta_2^2\|C'\|_F^2.$$

Note that, in the second step of (Eq. 2.29), the fact that for any real numbers $a_1$, $a_2$, $a_3$, $(a_1+a_2+a_3)^2 \leq 3(a_1^2+a_2^2+a_3^2)$ was used.

These are bounds on the expected error of g and $\tilde{C}'$. One can then use Markov's inequality to prove bounds that hold with high probability. For instance, using (Eq. 2.27), with probability at least $1-\eta$, results in $$\|g - \text{diag}(C)\|_2 \leq \frac{1}{\sqrt{\eta}} \sqrt{2} \delta_1 \|\text{diag}(C)\|_2, \quad \text{(Eq. 2.30)}$$

Using (Eq. 2.29), with probability at least $1-\eta$, results in:

$$\|\hat{C}' - C'\|_F \leq \frac{1}{\sqrt{\eta}} [3(n-1)(\delta_1+\delta_2)^2\|\text{diag}(C)\|_2^2 + 6\delta_2^2\|C'\|]^{1/2} \leq \quad \text{(Eq. 2.31)}$$

$$\frac{1}{\sqrt{\eta}} [\sqrt{3}\sqrt{n-1}(\delta_1+\delta_2)\|\text{diag}(C)\|_2 + \sqrt{6}\delta_2\|C'\|_F].$$

In fact, one can prove tighter bounds on the failure probability, by replacing Markov's inequality with a sharp concentration bound for sub-Gaussian random variables.

The bounds (Eq. 2.30) and (Eq. 2.31) give a rough sense of how well this estimator performs. In particular, these bounds show that the error in estimating C' depends on the magnitude of diag(C), as well as the magnitude of C'. This is due to the fact that the procedure for estimating the off-diagonal matrix element $c_{jk}$ also involves the diagonal matrix elements $c_{jj}$ and $c_{jk}$. These bounds may be used as a baseline to understand the performance of the disclosed compressed sensing estimators.

FIGS. 7A and 7B are tables illustrating sample complexity of different methods for reconstructing a correlation matrix C 400 (FIG. 6), of size n×n, with 2 s nonzero elements off the diagonal. In aspects, the naive method is to measure each element of C separately. "RIP-based" and "RIPless" refer to different analytical bounds on the accuracy of the reconstruction of matrix C 400 (FIG. 6). The asterisk (*) indicates that the results using the RIPless bound hold under a technical assumption that the diagonal of C does not have any unusually large elements. The different methods are parameterized in such a way that they reconstruct the diagonal of matrix C 400 (FIG. 6) up to an additive error of size $\delta\|\text{diag}(C)\|_2$, and they reconstruct the off-diagonal part of C up to an additive error of size $\delta\|C\|_F$. Each method makes use of single-qubit spectroscopy (with n experimental configurations or "measurement settings"), as well as multi-qubit spectroscopy (with m measurement settings, where m varies between m∝$n^2$ and m∝s log n). The total sample complexity, shown in the tables of FIGS. 7A and 7B, include both single-qubit and multi-qubit spectroscopy. For the compressed sensing method, the number of measurement settings can be as low as m∝s log n, using the RIPless bound, but the best sample complexity is achieved when m∝s $\log^4$n, using the RIP-based bound. This sample complexity, $O(\max(n, s)^2 \log^4(n))$, compares favorably with the sample complexity of the naive method, which is $O(n^3)$. Thus, Compressed sensing has an advantage over the naive method whenever $s \leq O(n^{3/2}/\log^2 n)$.

The performance of the disclosed compressed sensing method may be compared to the naive method where one measures each element of C independently. A rigorous comparison may be made based on the error bounds for each of these methods. These can be summarized as follows:

Naive: $\|\hat{C}-C\|_F \leq O(\sqrt{n}(\delta_1+\delta_2)\|\text{diag}(C)\|_2+\delta_2\|C'\|_F)$, (Eq. 1.4)

RIP-based: $\|W^{(opt)}-C\|_F \leq O(\sqrt{n}\delta_1\|\text{diag}(C)\|_2+\delta_2(\sqrt{n}\|\text{diag}(C)\|_2+\sqrt{2s}\|C'\|_F))$, (Eq. 1.5)

RIPless: $\|W^{(opt)}-C\|_F \leq O(s\log^{5/2}(n)[\delta_1\|\text{diag}(C)\|_\infty \sqrt{sn\log(n)}+\delta_2\sqrt{n}\|\text{diag}(C)\|_2+\delta_2\sqrt{2s}\|C'\|_F])$. (Eq. 1.6)

Here $\hat{C}$ is the estimate of C using the naive method, and $W^{(opt)}$ is the estimate of C using compressed sensing. diag(C) denotes the diagonal of C, and C' denotes the off-diagonal part of C. m∝s $\log^4$n is set for the RIP-based bound, and m∝s log n for the RIPless bound. (2.30) may be used to bound the error in estimating diag(C), and (Eq. 2.31), (Eq. 5.48) and (Eq. 5.39) to bound the error in estimating C'. Finally, $\delta_1$ and $\delta_2$ are parameters that control the accuracy of the single-qubit and multi-qubit spectroscopy procedures. Using the disclosed method rigorous bounds on the sample complexity may be proven that are required for each method to reconstruct C with comparable accuracy.

For the compressed sensing method, the number of measurement settings can be as low as m∝s log n, using the RIPless bound, but the best sample complexity is achieved when m∝s $\log^4$n, using the RIP-based bound. This sample complexity, $O(\max(n, s)^2 \log^4(n))$, compares favorably with the sample complexity of the naive method, which is $O(n^3)$. Thus, compressed sensing has an advantage over the naive method whenever $s \leq O(n^{3/2}/\log^2 n)$.

The estimation of the decay rate $\Gamma_{ab}=2r^T Cr$ may be performed with high precision (i.e., with small multiplicative error), by allowing the quantum system 100 to evolve for a time $t \sim 1/\Gamma_{ab}$. Here the time t is chosen by an adaptive procedure that starts with an initial guess $\tau_0$ and converges (provably) after $\sim |\log(\Gamma_{ab} \tau_0)|$ steps (see FIG. 3). To achieve high precision, the time evolution operator $e^{t\mathcal{L}}$ is treated exactly.

The above-noted feature is helpful in experimental setups where measurements are time-consuming and the values of $\Gamma_{ab}$ span several orders of magnitude, thus making it difficult to determine the appropriate evolution time and accurately measure the decay rates using conventional methods. This feature can also be used as a standalone technique to estimate the relaxation ($T_1$) and decoherence ($T_2$) times of any quantum system 100.

Figure 9A:
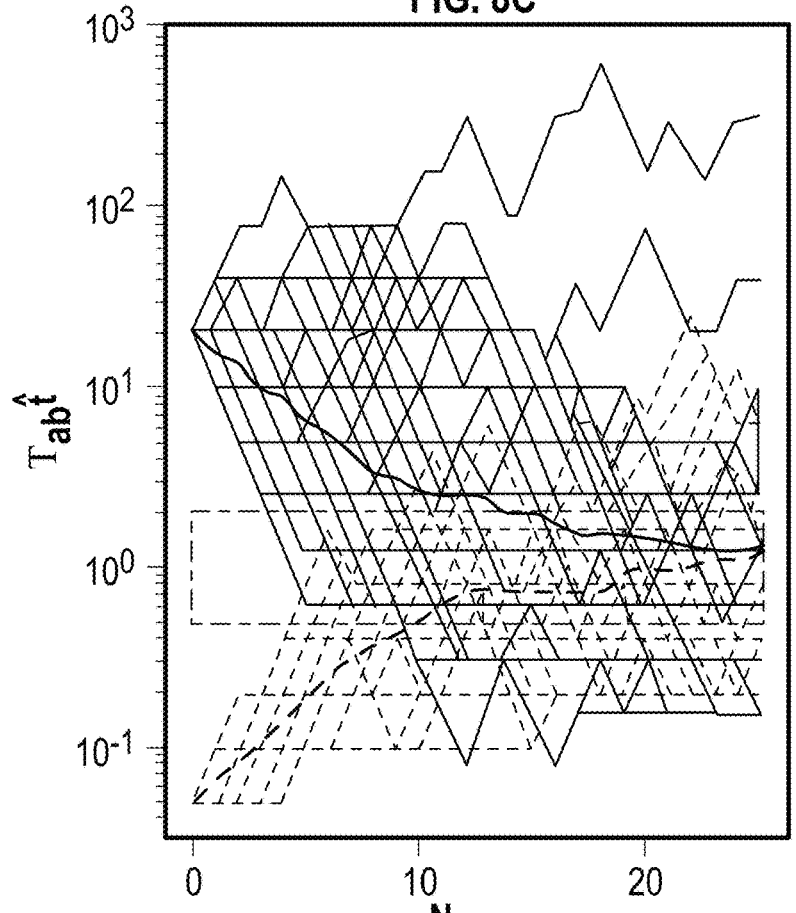
FIG. 9A is a graph that illustrates trajectories of a random walk used in estimating an evolution time, in accordance with examples of the present disclosure.
Figure 9B:
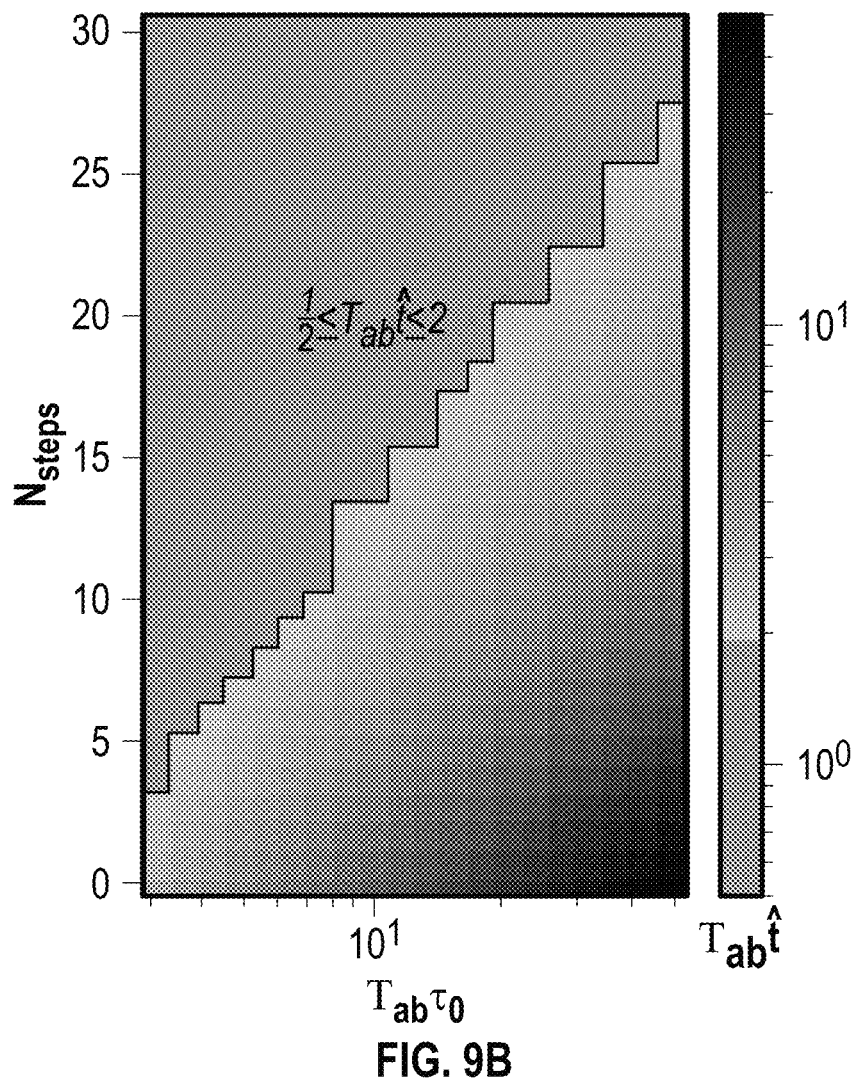
FIG. 9B is a graph that illustrates the accuracy of a final estimate of the evolution time, in accordance with examples of the present disclosure.

Since the disclosed method relies on estimating exponential decay rates, it can be made at least partially robust to state-preparation-and-measurement (SPAM) errors (see FIGS. 9A and 9B). This follows some of the same approaches used in randomized benchmarking and gate set tomography. The estimated decay rate may be used to estimate a relaxation time of the quantum system 100. In aspects, a decoherence time of the quantum system 100 may be estimated based on the estimated decay rate.

The disclosed method enables a unitary evolution according to some Hamiltonian $H_S$, and enables the matrix C 400 (FIG. 6) to have complex entries $c_{jk}$. A similar approach can be used to estimate the Hamiltonian $H_S$, as well as the imaginary part of $c_{jk}$. The disclosed technology measures correlated dephasing and not Pauli errors. In aspects, the measurement may include Ramsey spectroscopy. In aspects the reconstruction algorithm may include, for example, convex optimization over a continuous domain.

The disclosed method assumes that the noise is sparse, meaning that the noise is supported on a subset S of the domain, where S is small, but unknown.

It is contemplated that the disclosed method for SPAM-robust estimation of sparse noise models, may be used to characterize other kinds of correlated noise processes in many-body quantum systems.

The disclosed technology includes an efficient method for learning the off-diagonal part of the correlation matrix C, under the assumption that it is sparse, i.e., the part of C that lies above the diagonal has at most s nonzero elements, where $s \ll n(n-1)/2$. (Since C is Hermitian, it is sufficient to learn the part that lies above the diagonal; this then determines the part that lies below the diagonal.)

For simplicity, first consider the special case where the entries in the matrix C are real (i.e., with zero imaginary part), which occurs in a number of physical situations (for example, when the system is coupled to a bath at a high temperature.

The disclosed method consists of two steps: first, single-qubit Ramsey spectroscopy is performed in order to learn the diagonal elements of C; second, techniques from compressed sensing (e.g., random measurements, and $\ell_1$-minimization) are applied in order to recover the off-diagonal elements of C. In aspects, a long-range correlated dephasing error may be detected based on the recovered matrix.

In aspects, random measurements of the correlation matrix may be performed. Initially, each of the diagonal elements $c_{jj}$, for $j=1, \ldots, n$, are estimated using single-qubit Ramsey spectroscopy, as illustrated in FIG. 5. Let $g=(g_1, \ldots, g_n) \in \mathbb{R}^n$ be the output of this procedure. g may be viewed as an estimate of a "sensing operator" that returns the diagonal elements of the matrix C 400, $$g \approx \text{diag}(C) = (c_{11}, c_{22}, \ldots, c_{nn}). \quad \text{(Eq. 3.1)}$$

(Note that $c_{jj} \geq 0$, since C is positive semidefinite.)

In order to estimate the off-diagonal part of C, a compressed sensing technique is used, which involves a certain type of generalized Ramsey measurement with random GHZ-type states, see FIG. 4. First, a parameter m is chosen, which can be roughly $m \sim s \log n$ or $m \sim s \log^4 n$, which controls the number of different measurements. The particular choice of m may be motivated by a theoretical recovery guarantee. Now, for $j=1, \ldots, m$, perform the following procedure:

1. Choose vectors $a, b \in \{0,1\}^n$ uniformly at random. As in equation (2.4), define $$r=b-a. \quad \text{(Eq. 3.2)}$$

2. Prepare the state $$|\psi_{ab}\rangle = \frac{1}{\sqrt{2}}(|a\rangle + |b\rangle).$$

This is a GHZ state on a subset of the qubits, with some bit flips. It can be created by preparing those qubits i where $a_i = b_i$ in the state $|a_i\rangle$, preparing those qubits i where $a_i \neq b_i$ in a GHZ state, and applying a Pauli X operator on those qubits i where $a_i > b_i$. (This requires a quantum circuit of depth $\lceil \log_2(n) \rceil + 2$.)

3. Construct an estimate $\hat{\Gamma}_{ab}$ of the decay rate $\Gamma_{ab} = 2r^T C r$. Define $h_j = \hat{\Gamma}_{ab}$.

Let $h=(h_1, \ldots, h_m) \in \mathbb{R}^m$ be the output of the above procedure. Again, h may be viewed as an estimate of a "sensing operator" $\Phi: \mathbb{R}^{n \times n} \to \mathbb{R}^m$ that is applied to the matrix C 400 (FIG. 6), $$h \approx \Phi(C) = [\Phi_j(C)]_{j=1,\ldots,m} \quad \text{(Eq. 3.3)}$$

$$\Phi_j(C) = 2(r^{(j)})^T C r^{(j)} \quad \text{(Eq. 3.4)}$$

where $r^{(1)}, r^{(2)}, \ldots, r^{(m)} \in \{1,0,-1\}^n$ are independent random vectors chosen from the same distribution as r (described above). Note that $\Phi_j(C) \geq 0$, since C is positive semidefinite. The factor of 2 is chosen to ensure that $\Phi$ has a certain isotropy property, as described herein.

In aspects, the correlation matrix $C \in \mathbb{R}^{n \times n}$ may be reconstructed. C is positive semidefinite, due to physical constraints, and its off-diagonal part is sparse, with at most $s \ll n(n-1)/2$ nonzero elements above the diagonal. In general, this sparsity constraint leads to an optimization problem that is computationally intractable. However, in this particular case, this problem can be solved using a strategy from compressed sensing: given $g \approx \text{diag}(C) \in \mathbb{R}^n$ and $h \approx \Phi(C) \in \mathbb{R}^m$, matrix C 400 is recovered by solving a convex optimization problem, where the $\ell_1$ (vector) norm of the off-diagonal part of the matrix is minimized. This strategy succeeds when $m \geq c_0 s \log n$, and is highly robust to noise when $m \geq c_0 s \log^4 n$, where $c_0$ is some universal constant.

Initially, the case where the measurements are noiseless, i.e., $g=\text{diag}(C)$ and $h=\Phi(C)$ is considered. The following convex optimization problem is solved:

Find $W \in \mathbb{R}^{n \times n}$ that minimizes $\sum_{i \neq j} |W_{ij}|$, (Eq. 3.5)

such that:

$$\text{diag}(W) = g, \quad \text{(Eq. 3.6)}$$

$$\Phi(W) = h, \quad \text{(Eq. 3.7)}$$

$$W \succeq 0. \quad \text{(Eq. 3.8)}$$

Here, $W \succeq 0$ means that W is positive semidefinite, which implies that $W=W^T$. As a sanity check, note that $W=C$ is a feasible solution to this problem. (Recall that C is positive semidefinite.)

In phase retrieval, one wishes to estimate an unknown vector x from measurements of the form $|r^T x|^2$. In aspects, a PhaseLift algorithm works by "lifting" the unknown vector x to a matrix $X=xx^T$, so that the problem becomes one of learning a rank-1 matrix X from measurements of the form $r^T X r$; then one solves a convex relaxation of this problem. It is contemplated that in cases where the unknown vector x is sparse ("compressive phase retrieval"), variants of the PhaseLift algorithm (as well as other approaches) can also be used.

In the disclosed method, the unknown matrix C is almost always full-rank (because every qubit has a nonzero rate of dephasing). Physical constraints imply that C is positive semidefinite, so it can be factored as $C=BB^T$, which is superficially similar to $X=xx^T$; however, an important difference is that B is a square matrix, whereas x is a vector.

In aspects, the matrix C 400 may be reconstructed from noisy measurements. In the case where the measurements of g and h are noisy, the above convex optimization problem is modified, by relaxing the constraints (Eq. 3.6) and (Eq. 3.7). This leads to some technical complications, due to the fact that two variables are being reconstructed that have different characteristics: the diagonal part of C (which is not sparse), and the off-diagonal part of C (which is sparse).

To deal with these issues, two different ways of performing this reconstruction, when the measurements are noisy are: (1) simultaneous reconstruction of both parts of C, and (2) sequential reconstruction of the diagonal part of C, followed by the off-diagonal part of C. The former approach is arguably more natural, but the latter approach enables more rigorous analysis of the accuracy of the reconstruction.

Assuming the following bounds on the $\ell_2$ norms of the noise terms (u and v), that is, $$g = \text{diag}(C) + u, \|u\|_2 \leq \epsilon_1, \quad \text{(Eq. 3.9)}$$

$$h = \Phi(C) + v, \|v\|_2 \leq \epsilon_2. \quad \text{(Eq. 3.10)}$$

Simultaneous reconstruction of the diagonal and off-diagonal parts of C: the constraints (Eq. 3.6) and (Eq. 3.7) are relaxed in the simplest possible way, by replacing them with:

$$\|\text{diag}(W) - g\|_2 \leq \epsilon_1, \quad \text{(Eq. 3.11)}$$

$$\|\Phi(W) - h\|_2 \leq \epsilon_2. \quad \text{(Eq. 3.12)}$$

This leads to a convex optimization problem that attempts to reconstruct both the diagonal part of C, which is not necessarily sparse, and the off-diagonal part of C, which is assumed to be sparse. (Note that W=C is a feasible solution to this problem.)

The reconstruction algorithm involves two different estimators (an $\ell_1$-regularized estimator for the off-diagonal part of C, and a least-squares estimator for the diagonal part of C). These two estimators are coupled together (through the constraint on $\Phi(W)$, and the positivity constraint $W \succeq 0$).

Therefore, this method can behave quite differently, depending on whether the dominant source of error is g or h. When g is the dominant source of error, this method will behave like a least-squares estimator, whose accuracy scales according to the dimension n; when h is the dominant source of error, this method will behave like an $\ell_1$-regularized estimator, whose accuracy scales according to the sparsity s (neglecting log factors). From a theoretical point of view, this makes it more difficult to prove recovery guarantees for this method.

Sequential reconstruction of the diagonal part of C, followed by the off-diagonal part of C: In practice, one is often interested in the regime where g is known with high precision, and h is the dominant source of error. This is because measurements of g are relatively easy to perform, because they only require single-qubit state preparations and measurements; whereas measurements of h are more costly, because they require the preparation and measurement of entangled states on many qubits. So measurements of g can often be performed more quickly, and measurements on different qubits can be performed simultaneously in parallel; hence one can repeat the measurements more times, to obtain more accurate estimates of g.

In this regime, it is natural to try to recover the diagonal part of C directly from g, and then use $\ell_1$-minimization to recover only the off-diagonal part of C. This leads to a convex optimization problem which is arguably less natural, but it makes it easier to prove rigorous guarantees on the accuracy of the reconstruction of C. Starting from the convex optimization problem ((Eq. 3.5)-(Eq. 3.8)) for the noiseless case, and the last two constraints are relaxed to get:

$$\text{Find } W \in \mathbb{R}^{n \times n} \text{ that minimizes } \sum_{k \neq j} |W_{ij}|, \quad \text{(Eq. 3.13)}$$

such that:

$$\text{diag}(W) = g, \quad \text{(Eq. 3.14)}$$

$$\|\Phi(W) - h\|_2 \leq \epsilon_2 + \epsilon_1 \sqrt{mn}, \quad \text{(Eq. 3.15)}$$

$$d(W, K_+) \leq \epsilon_1, \text{ and } W = W^T. \quad \text{(Eq. 3.16)}$$

Here $K_+ = \{W' \in \mathbb{R}^{n \times n} | W' \succeq 0\}$ denotes the (real) positive semidefinite cone, and $$d(W, K_+) = \min_{W' \in K_+} \|W - W'\|_F \quad \text{(Eq. 3.17)}$$

to be the minimum distance from W to a point W' in $K_+$, measured in Frobenius norm; note that this is a convex function. While this convex optimization problem looks complicated, it follows from a simple underlying idea: since the diagonal elements of W are fixed by the constraint (Eq. 3.14), this is simply an $\ell_1$-regularized estimator for the sparse, off-diagonal part of W.

The attentive reader will notice two potential concerns with this approach. First, in general, C will not be a feasible solution to this convex optimization problem, since the diagonal elements of C will not satisfy (Eq. 3.14). However, C lies close to a feasible solution. To see this, let $\tilde{C}$ be the matrix whose off-diagonal elements agree with C, and whose diagonal elements agree with g. Then C is within distance $\epsilon_1$ of $\tilde{C}$ (in Frobenius norm), and $\tilde{C}$ is a feasible solution. To see this, check that $\tilde{C}$ satisfies the constraints (Eq. 3.14), (Eq. 3.15) and (Eq. 3.16), since:

$$\left\|\Phi(\tilde{C}) - \Phi(C)\right\|_2 = \|\Phi(\text{diag}(g - \text{diag}(C)))\|_2 \quad (3.18)$$

$$\leq \left(m\|g - \text{diag}(C)\|_1^2\right)^{1/2}$$

$$\leq \epsilon_1 \sqrt{mn}.$$

(Here, $\tilde{C}$ is written in a compact form, $\tilde{C} = C + \text{diag}(g - \text{diag}(C))$, where the diag(·) notation has the following meaning: for a matrix M, diag (M) is the vector containing the entries $M_{jj}$ that lie along the diagonal of M; and for a vector $v = (v_1, \ldots, v_n)$, diag(v) is the diagonal matrix with $v_1, \ldots, v_n$ along the diagonal.)

Second, the optimal solution W may violate the positivity constraint (Eq. 3.8), making it un-physical/non-physical. (Similar issues can arise when performing quantum state and process tomography.) However, W can be easily corrected to get a physically-admissible solution. This follows because equation (3.16) shows that W lies within distance $\epsilon_1$ of a physically-admissible solution $W' \succeq 0$, and this solution W' can be obtained by truncating the negative eigenvalues of W.

Finally, there are different ways of relaxing the positivity constraint (Eq. 3.8), and (Eq. 3.16) is not the strongest possible choice. For instance, a stronger constraint could be used than (Eq. 3.16), such as: $d'(W, K_+) \leq \epsilon_1$, where $d'(W, K_+) = \min_{W' \in K_+} \|\text{diag}(W - W')\|_2$. However, the constraint (Eq. 3.16) may be simpler to implement using numerical linear algebra software.

Since these are convex optimization problems, they can be solved efficiently (both in theory and in practice), for instance by using interior point algorithms. Nonetheless, some care is needed to ensure that these algorithms can scale up to solve very large instances of these problems. In particular, enforcing the positivity constraint (Eq. 3.8), and its relaxed version (Eq. 3.16), can be computationally expensive.

In aspects, the positivity constraint may be omitted. The matrix C 400 can be reconstructed by solving the convex optimization problem (Eq. 3.13)-(Eq. 3.16). This analysis holds even without the positivity constraint (Eq. 3.16). In aspects, it is easy to check that the positivity constraint is not used, and indeed, most of the theory of compressed sensing applies to all sparse signals, not just positive ones, although positivity can be helpful in certain situations.

This observation has a practical consequence: by omitting the positivity constraint (Eq. 3.16), one can make the convex optimization problem simpler, and thus easier to solve in practice (e.g., by using second-order cone programming, rather than semidefinite programming). One can then take the resulting solution, and project it onto the positive semi-definite cone, as is sometimes done in quantum state tomography, without increasing the error (in Frobenius norm). This technique is useful for scaling up the disclosed method to extremely large numbers of qubits.

Next, setting the Error Parameters $\epsilon_1$ and $\epsilon_2$ is described. To set the parameters $\epsilon_1$ and $\epsilon_2$ in equations (3.9) and (3.10): First, consider $\epsilon_1$, which bounds u, the error in g. Note that, when $g_j$ is estimated using the above noted procedure, large-deviation bounds on $u_j$ are obtained. In particular, for some $\delta_1 > 0$, $\|u_j\|_{\psi_2} \leq \delta_1 c_{jj}$, (Eq. 3.19)

where $\|\cdot\|_{\psi_2}$ is the sub-Gaussian norm. This bound can be obtained from equation (2.10), by setting $N_{trials} \sim 1/\delta_1^2$. The trials of the experiment that are used to choose the evolution time t may be neglected in the count, because the number of those trials grows only logarithmically with $\Gamma_{ab}$.

This implies that $\|u\|_2^2$ is a subexponential random variable, whose subexponential norm is at most $2\delta_1^2 \|\text{diag}(C)\|_2^2$. This implies that $\|u\|_2$ is bounded with high probability: for any $\tau \geq 1$, $Pr[\|u\|_2 \geq \tau \delta_1 \|\text{diag}(C)\|_2] \leq e \cdot \exp(-\tau^2/2c)$, (Eq. 3.20) where c>0 is some universal constant. $\tau$ may be chosen to be a sufficiently large constant, so that the failure probability is small. (Note that in some cases, one can prove stronger bounds, by taking advantage of the fact that the coordinates of u are independent, and using a Bernstein-type inequality. This bound is stronger when the diagonal elements of C satisfy $\|\text{diag}(C)\|_\infty << \|\text{diag}(C)\|_2$, i.e., when u has many independent coordinates with similar magnitudes.)

The above bound does not immediately tell how to set $\epsilon_1$, because the bound depends on diag(C), which is not known exactly. Instead, a bound that depends on g is derived, which is known explicitly, and can be used to set $\epsilon_1$. To do this, assume that $\delta_1$ is sufficiently small so that $\tau \delta_1 < 1/4$. With high probability:

$$\|u\|_2 \leq \tau\delta_1 \|\text{diag}(C)\|_2 \quad (3.21)$$
$$\leq \tau\delta_1 (\|g\|_2 + \|u\|_2)$$
$$\leq \frac{\tau\delta_1}{1-\tau\delta_1} \|g\|_2 =: \epsilon_1,$$

Using the triangle inequality, and some algebra shows how to set $\epsilon_1$ so that equation (3.9) holds.

$\epsilon_1$ may also be bounded in terms of diag(C), as follows:

$$\epsilon_1 \leq \frac{\tau\delta_1}{1-\tau\delta_1}(\|\text{diag}(C)\|_2 + \|u\|_2) \quad \text{(Eq. 3.22)}$$
$$\leq \frac{\tau\delta_1}{1-\tau\delta_1}(1+\tau\delta_1)\|\text{diag}(C)\|_2$$
$$\leq 2\tau\delta_1 \|\text{diag}(C)\|_2.$$

In aspects, this bound may be used to analyze the accuracy of the estimate of matrix C 400. $\epsilon_2$ bounds v, which is the error in h. The same approach as above may be used. When $h_j$ is estimated a bound on the sub-Gaussian norm of $v_j$ is obtained: for some $\delta_2 > 0$, $$\|v_j\|_{\psi_2} \leq \delta_2 \Phi_j(C). \quad \text{(Eq. 3.23)}$$

(This bound can be obtained from equation (2.10), by setting $N_{trials} \sim 1/\delta_2^2$. $\delta_2$ to may be different from $\delta_1$, because the measurements used to estimate $h_j$ are more costly than the measurements used to estimate $g_j$, hence one may prefer to use different values for $N_{trials}$ in each case.)

This implies that $\|v\|_2^2$ is a subexponential random variable, hence $\|v\|_2$ is bounded with high probability: for any $\tau \geq 1$, $$Pr[\|v\|_2 \geq \tau\delta_2 \|\Phi(C)\|_2] \leq e \cdot \exp(-\tau_2/2c), \quad \text{(Eq. 3.24)}$$

where c>0 is some universal constant, choose $\tau$ to be a sufficiently large constant, so that the failure probability is small. (Note that, for typical choices of $\Phi(\cdot)$, it is expected that $\|\Phi(C)\|_\infty << \|\Phi(C)\|_2$. This implies that v has many independent coordinates with similar magnitudes. When this occurs, one can prove a stronger bound using a Bernstein-type inequality.

The above bound does not immediately show how to set $\epsilon_2$, because the bound depends on $\Phi(C)$, which is not known exactly. Instead, derive a bound that depends on h, which is known explicitly, and can be used to set $\epsilon_2$. To do this, it is assumed that $\delta_2$ is sufficiently small so that $\tau\delta_2 < 1/4$. With high probability:

$$\|v\|_2 \leq \tau\delta_2 \|\Phi(C)\|_2 \quad (3.25)$$
$$\leq \tau\delta_2 (\|h\|_2 + \|v\|_2)$$
$$\leq \frac{\tau\delta_2}{1-\tau\delta_2} \|h\|_2 =: \epsilon_2.$$

This indicates how to set $\epsilon_2$ so that equation (3.10) holds. Finally, $\epsilon_2$ can also be bounded in terms of $\|C\|_{\ell_1}$, as follows:

$$\epsilon_2 \leq \frac{\tau\delta_2}{1-\tau\delta_2}(\|\Phi(C)\|_2 + \|v\|_2) \quad (3.26)$$
$$\leq \frac{\tau\delta_2}{1-\tau\delta_2}(1+\tau\delta_2)\|\Phi(C)\|_2$$
$$\leq 2\tau\delta_2 \|\Phi(C)\|_2$$
$$\leq 2\tau\delta_2 \sqrt{m} \|\Phi(C)\|_\infty$$
$$\leq 4\tau\delta_2 \sqrt{m} \|C\|_{\ell_1}.$$

In aspects, this bound may be used when analyzing the accuracy of the estimate of C.

Figure 8A:
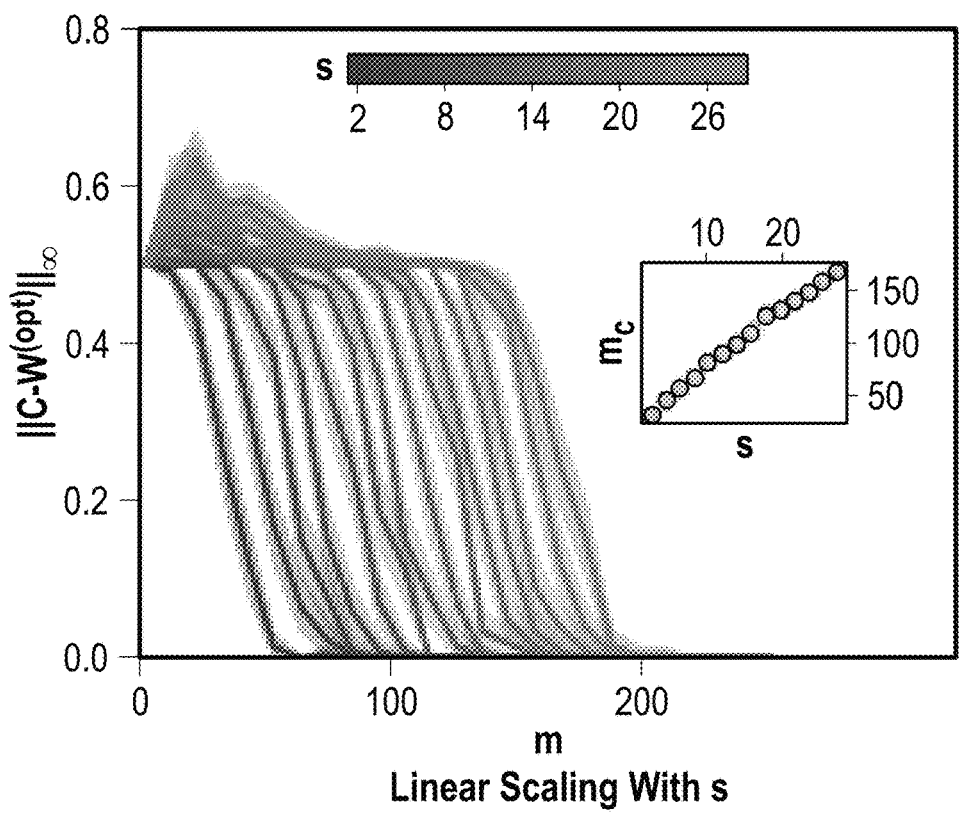
FIGS. 8A-8C are graphs that illustrate scaling of the reconstruction error under various circumstances, in accordance with examples of the present disclosure.
Figure 8B:
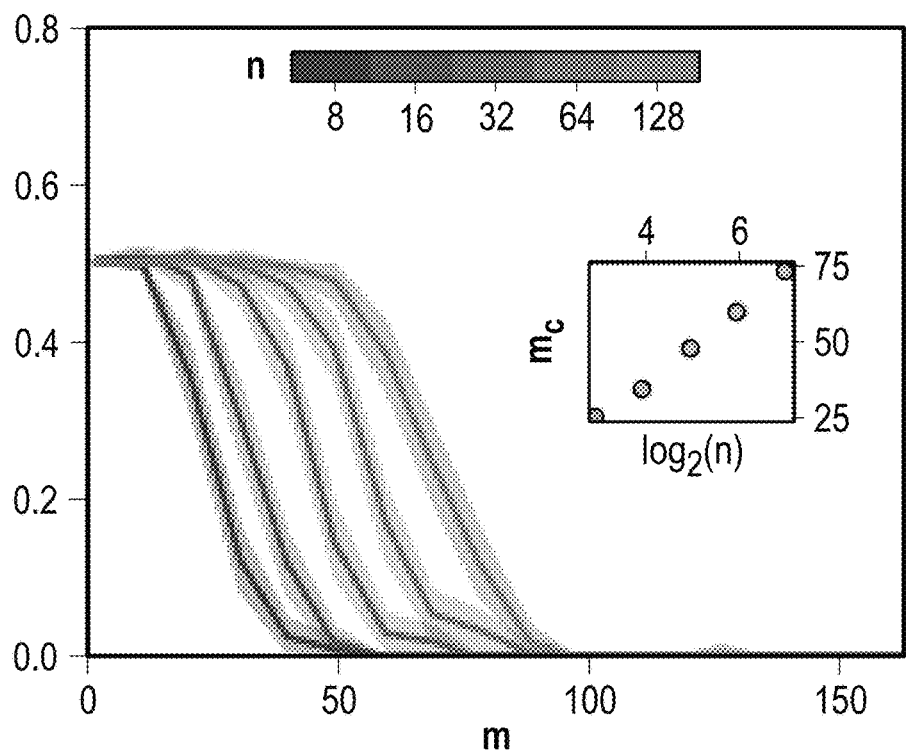
Figure 8C:
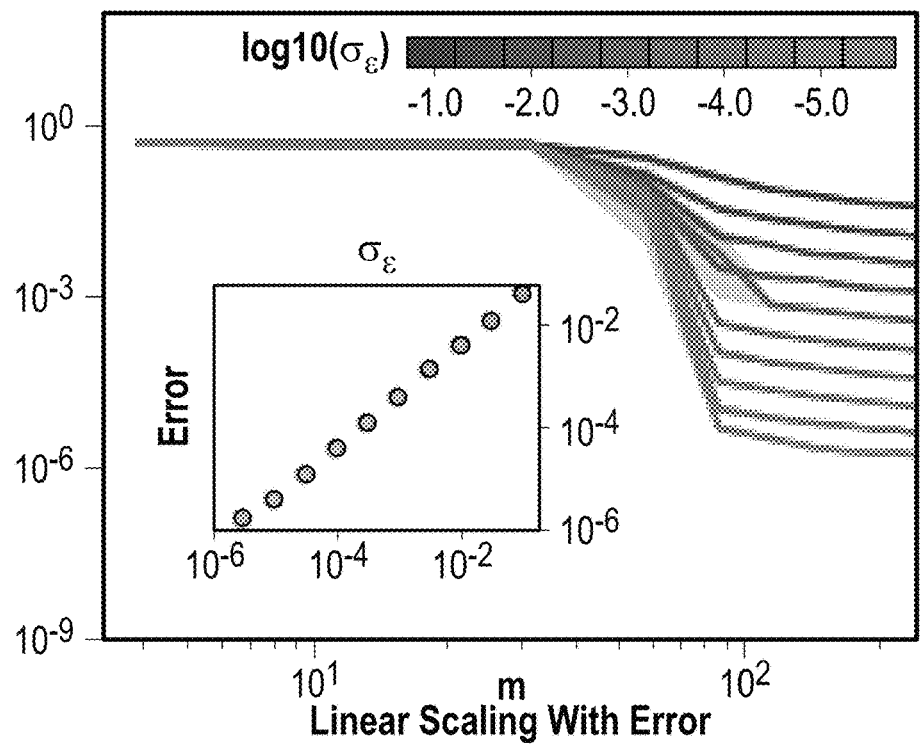

Referring to FIGS. 8A-8C, graphs that illustrating scaling of the reconstruction error $\|W^{(opt)} - C\|_\infty$ under various circumstances are shown. Here $W^{(opt)}$ denotes the estimate of C obtained via compressed sensing. The solid lines are the average errors over 100 random instances of the problem, and the shaded region is their 95% confidence interval obtained by bootstrapping. FIG. 8A illustrates the reconstruction error as a function of the number of measurement settings m (assuming noiseless measurements) for various values of sparsity s (and n=64 qubits). The errors go through a phase transition whose location $m_c$ scales linearly with s. FIG. 8B illustrates the reconstruction error as a function of the number of measurement settings m (assuming noiseless measurements) for various numbers of qubits n (and sparsity s=12). The phase transition point $m_c$ scales logarithmically with n. FIG. 8C illustrates the reconstruction error as a function of the number of measurement settings m, for different values of added noise strength $\sigma_\epsilon$, with fixed parameters (n, s)=(64,12). The inset shows that the recovery errors (when m>$m_c$, i.e., after the transition point) scale linearly with $\sigma_\epsilon$, as expected.

Numerical simulations are used to test the performance of the disclosed method on realistic system sizes, with different levels of sparsity, and when the data contain statistical fluctuations due to finite sample sizes. As shown in FIGS. 8A-8C, the disclosed method performs well overall.

The protocol for randomly chosen C matrices is numerically simulated. In these examples it is assumed that the diagonal elements of C are known, that is, $\epsilon_1$=0 in Eq. (3.11). The convex optimization problem given by equations (3.5)-(3.7) is solved using, for example, CVXPY, a convex optimization package for Python®.

The case of noiseless measurements, corresponding to $\epsilon_2$=0 in Eq. (3.12) is investigated. In FIG. 8A the recovery error is shown as a function of the number of measurements, m, for a fixed number of qubits, n, and various choices of the off-diagonal sparsity, s. The sharp transition in the recovery error as a function of m is evident. Moreover, as shown in the inset of FIG. 8A, the transition point $m_c$, which is defined as the point where $\|C-W^{(opt)}\|_\infty$ drops below 0.25, scales linearly with s, consistent with the analytical results. In FIG. 8B s is fixed, n is varied, and the recovery error as a function of m is studied. A phase transition may be observed as m increases. In this case, $m_c$ scales polynomially with log(n) as suggested in the inset of FIG. 8B.

The effect of noisy measurements on the recovery error is investigated. Random C matrices may be generated, with a fixed number of qubits n and sparsity s. Noise is simulated by adding a random vector e, whose entries are independent Gaussian random variables with mean 0 and standard deviation $\sigma_\epsilon$, to measurement vector h. Eq. (3.7) may be replaced in the previous convex program with Eq. (3.12) and choose $\epsilon_2=\sqrt{m}\sigma_\epsilon$. The scaling of the reconstruction error $\|W^{(opt)}-C\|_\infty$ as a function of $\sigma_\epsilon$ is shown in FIG. 8C. The recovery error after the phase transition point scales linearly with $\sigma_\epsilon$, consistent with the proposed analytical bounds.

The convex optimization problem (Eq. 3.13)-(Eq. 3.16) is used to prove rigorous recovery guarantees that show that the optimal solution $W^{(opt)}$ is close to the true correlation matrix C 400 (FIG. 6), provided that m≥$c_0$s log n (and with better robustness to noise, when m≥$c_0$s $\log^4$n). Here, m is the dimension of the measurement vector h, s is the sparsity (the number of nonzero elements) in the off-diagonal part of the matrix C, and $c_0$ is some universal constant.

In aspects, two different results are proven: a non-universal recovery guarantee, using the "RIPless" framework, as well as a universal recovery guarantee, using RIP-based techniques. Here, RIP refers to the "restricted isometry property," a fundamental proof technique in compressed sensing. There are different advantages to the RIPless and RIP-based bounds: the RIPless bounds require slightly fewer measurements, while the RIP-based bounds are more robust when the measurements are noisy.

In aspects, two variants of the problem (Eq. 3.13)-(Eq. 3.16) are introduced: constrained $\ell_1$-minimization and the LASSO ("least absolute shrinkage and selection operator").

Generally speaking, recovery guarantees that hold for one of these problems can be adapted to the other one, with minor modifications.

To simplify the problem, start with the convex optimization problem (Eq. 3.13)-(Eq. 3.16). Remove the positivity constraint $d(W,K_+)\leq\epsilon_1$. Change the objective function to sum over all i<j rather than all i≠j; since W is symmetric, this merely changes the objective function by a factor of 2. Finally, shift the variable W by subtracting away diag(g), so that its diagonal elements are all zero. Similarly, shift the measurement vector h to get h'=h−Φ(diag(g)). (Eq. 5.1)

This provides an equivalent problem:

Find $W \in \mathbb{R}^{n\times n}$ that minimizes $\sum_{i<j} |W_{ij}|$, (Eq. 5.2)

such that:

$\text{diag}(W) = 0$, (Eq. 5.3)

$\|\Phi(W) - h'\|_2 \leq \epsilon_2 + \epsilon_1\sqrt{mn}$, (Eq. 5.4)

$W = W^T$. (Eq. 5.5)

An operation diag(·) that has two meanings: given an n×n matrix M, diag(M) returns an n-dimensional vector containing the diagonal elements of M; and given an n-dimensional vector v, diag(v) returns an n×n matrix that contains v along the diagonal, and zeros off the diagonal.

Define C' to be the off-diagonal part of the correlation matrix C, that is, C' is the matrix whose off-diagonal elements match those of C, and whose diagonal elements are zero.

$C' = C - \text{diag}(\text{diag}(C))$. (Eq. 5.6)

h' may be viewed as a measurement of C', with additive error z, h'=Φ(C')+z. (Eq. 5.7)

The solution $W^{(opt)}$ is an accurate estimate of C'. The error term z may be written in the form:

$$z = h' - \Phi(C')$$ (5.8)
$$= h - \Phi(C) - \Phi(\text{diag}(g - \text{diag}(C)))$$
$$= v - \Phi(\text{diag}(u)),$$

where u and v are the noise terms in (Eq. 3.9) and (Eq. 3.10). next, bound z using (Eq. 3.10) and (Eq. 3.18), $\|z\|_2 \leq \epsilon_2 + \epsilon_1\sqrt{mn}$. (Eq. 5.9)

It will be convenient to write $D = \{W \in \mathbb{R}^{n\times n} | W^T = W, \text{diag}(W) = 0\}$ (Eq. 5.10)

to denote the subspace of symmetric matrices whose diagonal elements are all 0. Let uvec: $D \to \mathbb{R}^{n(n-1)/2}$ denote the linear operator that returns the upper-triangular part of W, uvec: $W \mapsto (W_{ij})_{i<j}$. (Eq. 5.11)

Write $\Phi_D: D \to \mathbb{R}^m$ to denote the measurement operator Φ restricted to act on the subspace D. The problem (Eq. 5.2)-(Eq. 5.5) may be rewritten in a more concise form:

Find $W \in D$ that minimizes $\|uvec(W)\|_1$, (Eq. 5.12)

such that:

$\|\Phi_D(W) - h'\|_2 \leq \epsilon_2 + \epsilon_1\sqrt{mn}$. (Eq. 5.13)

In aspects, a variant of the problem includes the LASSO: Find $W \in D$ that minimizes $$\frac{1}{2}\|\Phi_D(W) - h'\|_2^2 + \lambda\|uvec(W)\|_1. \qquad \text{(Eq. 5.14)}$$

This can be viewed as a Lagrangian relaxation of the previous problem ((Eq. 5.12)-(Eq. 5.13)), or as an $\ell_1$-regularized least-squares problem. In addition, the convex optimization problems that were described earlier can also be relaxed into a LASSO-like form, in a similar way. The choice of the regularization parameter $\lambda$ requires some care.

In aspects, the Regularization Parameter $\lambda$ may be set by the following procedure. In general, the regularization parameter $\lambda$ controls the relative strength of the two parts of the objective function in. When the noise in the measurement of h' is strong, then $\lambda$ must be set large enough to ensure that the $\ell_1$ regularization term still has the desired effect. However, if A is too large, it strongly biases the solution $W^{(opt)}$, making it less accurate.

An approach to setting $\lambda$, may be to have a goal that is to ensure that the solution $W^{(opt)}$ converges to (a sparse approximation of) the true correlation matrix C. To do this, $\lambda$ must be set large enough to satisfy two constraints, which involve the noise in the measurement of h' (see equation (4.1) and the equation below (4.2)). When these constraints are satisfied, the error in the solution $W^{(opt)}$ is bounded by equation (4.2). (Note that this error bound grows with 2L, hence one should choose the smallest value of $\lambda$ that satisfies the above constraints.)

In order to set 2L, first, precise statements of the two constraints on $\lambda$ are provided:

$$\|uvec(\Phi_D^\dagger z)\|_\infty \leq \lambda, \qquad \text{(Eq. 5.15)}$$

$$\|uvec(\Phi_{D,T^c}^\dagger (I-P)z)\|_\infty \leq \lambda. \qquad \text{(Eq. 5.16)}$$

Here, z is the noise term in the measurement of h' in equation (5.7); $\Phi_D^\dagger : \mathbb{R}^m \to D$ is the adjoint of the measurement operator $\Phi_D$; $T \subset \{(j,j')|1 \leq j < j' \leq n\}$ is the support of (a sparse approximation of) the true correlation matrix C; $\Phi_{D,T}$ is the sub-matrix of $\Phi_D$ that contains those columns of $\Phi_D$ whose indices belong to the set T; P is the projection onto the range of $\Phi_{D,T}$; $T^c$ is the complement of the set T; and $\Phi_{D,T^c}$ is the sub-matrix of $\Phi_D$ that contains those columns of $\Phi_D$ whose indices belong to the set $T^c$.

In order to set $\lambda$, compute the quantities in equations (5.15) and (5.16), and to do this, some bounds on the noise z are needed. Two ways of obtaining such bounds include:

One straightforward way is as follows. Equation (5.8) can be used to write $$z = v - \Phi(\text{diag}(u)), \qquad \text{(Eq. 5.17)}$$

where u and v are the noise terms in the measurements of g and h, respectively. Bounds on u and v (see equations (3.21) and (3.25)) imply bounds on z, via an elementary calculation. However, one can get better bounds on z by using a more sophisticated approach, starting with bounds on the sub-Gaussian norms of $u_j$ and $v_j$, such as equations (3.19) and (3.23). Assume that g and h are measured using the procedures described previously. Then equations (3.19) and (3.23) provide bounds on the sub-Gaussian norms of $u_j$ and $v_j$:

$$\|u_j\|_{\psi_2} \leq \delta_1 c_j, \qquad \text{(Eq. 5.18)}$$

$$\|v_j\|_{\psi_2} \leq \delta_2 \Phi_j(C). \qquad \text{(Eq. 5.19)}$$

Using these bounds, set $\lambda$ so that it satisfies equations (5.15) and (5.16) with high probability. More precisely, set $$\lambda := \left(\epsilon_1''' \cdot 4\sqrt{mn} + \epsilon_2'''\right) 4\sqrt{m}\left(1 + \sqrt{2}\right)\sqrt{\ln(n)/c'}, \qquad \text{(Eq. 5.20)}$$

$$\text{where } \epsilon_1''' := \frac{\delta_1}{1-\epsilon_1''}\|g\|_\infty, \epsilon_1'' := 2\sqrt{\ln(n)/c_0}\,\delta_1, \qquad \text{(Eq. 5.21)}$$

$$\epsilon_2''' := \frac{\delta_2}{1-\epsilon_2''}\|h\|_\infty, \epsilon_2'' := 2\sqrt{\ln(m)/c_0}\,\delta_2. \qquad \text{(Eq. 5.22)}$$

Here assume that $\delta_1$ and $\delta_2$ are sufficiently small (for instance, $\delta_1 \lesssim 1/\sqrt{\ln(n)}$ $\delta_2 \lesssim 1/\sqrt{\ln(n)}$ to ensure that $\epsilon''_1 < \frac{1}{2}$ and $\epsilon''_2 < \frac{1}{2}$. Also, here c' and $c_0$ are universal constants (which are defined in the proof below).

Now let the correlation matrix C and measurement operator $\Phi_D$ be fixed, and note that the noise term z is stochastic. With high probability (over the random realization of z), equations (5.15) and (5.16) are be satisfied; here the failure probability is at most $(e/n^3)+(e/m^3)+(2e/n^{1+2\sqrt{2}})$.

Finally, the following simple upper bounds on $\epsilon'''_1, \epsilon'''_2$ and $\lambda$ (these follow from the definitions of $\epsilon'''_1$ and $\epsilon'''_2$, the definitions of g and h, and the definition of $\Phi(\cdot)$):

$$\epsilon'''_1 \leq 3\delta_1\|\text{diag}(C)\|_{2\delta}, \qquad \text{(Eq. 5.23)}$$

$$\epsilon'''_2 \leq 6\delta_2\|C\|_{\ell_1}, \qquad \text{(Eq. 5.24)}$$

$$\lambda \leq O(\sqrt{m\ln(n)}(\delta_1\|\text{diag}(C)\|_\infty\sqrt{mn}+\delta_2\|C\|_{\ell_1})). \qquad \text{(Eq. 5.25)}$$

These bounds may be used to analyze the accuracy of the estimate of matrix C 400 (FIG. 6). Next, isotropy and incoherence of the measurement operator is described. The rows of the measurement operator $\Phi_D$ have two properties, isotropy and incoherence, which play a fundamental role in compressed sensing. Let Q be the matrix (of size m by $n(n-1)/2$) that represents the action of $\Phi_D$ (using the fact that the subspace D is isomorphic to $\mathbb{R}^{n(n-1)/2}$); that is, Q and $\Phi_D$ are related by the equation:

$$\Phi_D(C) = Q \cdot uvec(C), \forall C \in D. \qquad \text{(Eq. 5.26)}$$

The rows of Q are chosen independently at random, and each row has the form $$q = 4\,uvec(rr^T) \in \mathbb{R}^{n(n-1)/2}, \qquad \text{(Eq. 5.27)}$$

where r is sampled from the distribution described in (Eq. 3.2). q is centered if it has mean $\mathbb{E}(q)=0$, and q is isotropic if its covariance matrix is the identity:

$$\mathbb{E}(qq^T) = I. \qquad \text{(Eq. 5.28)}$$

It is straightforward to check that q is centered and isotropic (up to a normalization (Eq. 5.29)

factor of 2), $$\text{since: } \begin{cases} \mathbb{E}[r_i r_j] = 0 & i < j \\ \mathbb{E}[r_i r_j r_k r_l] = 0 & i < j \text{ and } k < l \text{ and } \{i,j\} \cap \{k,l\} = \emptyset \\ \mathbb{E}[r_i r_j r_k r_l] = 0 & i < j \text{ and } k < l \text{ and } |\{i,j\} \cap \{k,l\}| = 1 \\ \mathbb{E}[r_i r_j r_k r_l] = \frac{1}{4} & i < j \text{ and } k < l \text{ and } i = k \text{ and } j = l \end{cases}$$

(Note that in the last line of Eq. 5.29, a case with i=l and j=k, as the requirements of i<j and k<l leads to a contradiction.)

In addition, q is incoherent with parameter $\mu>0$ if, with probability 1, all of its coordinates are small: $\|q\|_\infty^2 \leq \mu$. (Eq. 5.30)

In order for this to be useful for compressed sensing, one needs $\mu$ to be small, at most polylogarithmic in the dimension of q. For example, q is incoherent with parameter $\mu=16$.

A non-universal recovery guarantee, using the "RIPless" framework is described herein, which in turn relies on the isotropy and incoherence properties described above.

Let $C \in \mathbb{R}^{n \times n}$ be a correlation matrix, and let $C'' \in D$ be its off-diagonal part (see equation (5.6)). C' is approximately s-sparse, i.e., there exists a matrix $C^{(s)} \in D$ that has at most s nonzero entries above the diagonal, and that approximates C' in the (vector) $\ell_1$ norm, up to an error of size $\eta_s$. This can be written compactly as:

$$\|uvec(C'-C^{(s)})\|_1 \leq \eta_s,\quad\text{(Eq. 5.31)}$$

where uvec(·) was defined in equation (5.11). (Recall that both C' and $C^{(s)}$ are symmetric, with all zeros on the diagonal. Hence it suffices to consider those matrix entries that lie above the diagonal.)

Choose the measurement operator $\Phi$ at random (see equation (3.4)). Assume that m (the dimension of h) satisfies the bound:

$$m \geq \tilde{c}_0(1+\beta) \cdot 4s \log \frac{n(n-1)}{2}.\quad\text{(Eq. 5.32)}$$

Here, $\tilde{c}_0$ is a universal constant, and $\beta>0$ is a parameter that can be chosen freely by the experimenter. Note that m scales linearly with the sparsity s, but only logarithmically with the dimension n of the matrix C. This scaling is close to optimal, in an information-theoretic sense. This is one way of quantifying the advantage of compressed sensing, when compared with measurements that do not exploit the sparsity of C.

Measure $g \approx diag(C)$ and $h \approx \Phi(C)$, and calculate h' (see equation (5.1)). Let $\delta_1$ and $\delta_2$ quantify the noise in the measurements of g and h, as described in equations (5.18) and (5.19). Next, solve the LASSO problem, setting the regularization parameter $\lambda$ according to (Eq. 5.20). Let $W^{(opt)}$ be the solution of this optimization problem.

Now the following recovery guarantee is noted, which shows that $W^{(opt)}$ provides a good approximation to C', in both the Frobenius ($\ell_2$) norm, and the vector $\ell_1$ norm. Theorem 1: For any correlation matrix C satisfying the sparsity condition (5.31), with probability at least $$1 - \frac{12}{n(n-1)} - 6e^{-\beta}$$

(over the random choice of the measurement operator $\Phi$, with m set according to (Eq. 5.32)), the solution $W^{(opt)}$ is close to C', with an error that is bounded by:

$$\|W^{(opt)} - C'\|_F \leq \sqrt{2}c(1+\alpha)\left[\frac{\eta_s}{\sqrt{s}} + \lambda\sqrt{s}\right],\quad\text{(Eq. 5.33)}$$

$$\|W^{(opt)} - C'\|_{\ell_1} \leq 2c(1+\alpha)[\eta_s + \lambda s],\quad\text{(Eq. 5.34)}$$

where c is a universal constant, and $$\alpha \leq \log^{3/2}\left(\frac{n(n-1)}{2}\right).$$

In these bounds, the first term upper-bounds the error that results from approximating C' by a sparse matrix, and the second term upper-bounds the error due to noise in the measurements of g and h.

To make the second term more transparent, the second term can be combined with the bound on $\lambda$ from equation (5.25):

$$\lambda \leq O(\sqrt{m\ln(n)}(\delta_1\|diag(C)\|_\infty\sqrt{mn}+\delta_2\|C\|_{\ell_1})),\quad\text{(Eq. 5.35)}$$

where $\delta_1$ and $\delta_2$ quantify the noise in the measurements of g and h, as described earlier. Also, it is useful to consider the special case where C' is exactly s-sparse, so $\eta_s=0$, and where as few measurement settings as possible are used, by setting $m \propto s \log n$. In this case:

$$\|W^{(opt)}-C'\|_F \leq O(\log^{3/2}(n)\lambda\sqrt{s})\quad\text{(Eq. 5.36)}$$

$$\leq O(\sqrt{s}\log^{3/2}(n)\sqrt{m\log(n)}\cdot[\delta_1\|diag(C)\|_\infty\sqrt{mn}+\delta_2\|C\|_{\ell_1}])\quad\text{((Eq. 5.37)}$$

$$\leq O(s\log^{5/2}(n)[\delta_1\|diag(C)\|_\infty\sqrt{sn\log(n)}+\delta_2\|C\|_{\ell_1}])\quad\text{(Eq. 5.38)}$$

$$\leq O(s\log^{5/2}(n)[\delta_1\|diag(C)\|_\infty\sqrt{sn\log(n)}+\delta_2\sqrt{n}\|diag(C)\|_2+\delta_2\sqrt{2s}\|C'\|_F]).\quad\text{(Eq. 5.39)}$$

This can be compared with the error bound (Eq. 2.31) for the naive method, and the RIP-based error bound (Eq. 5.48) for compressed sensing. Generally speaking, compressed sensing has an advantage over the naive method when s is small, and the RIPless bound is useful in the regime between $m \propto s \log n$ and $m \propto s \log^4 n$, where the RIP-based bound does not apply. (When m is in the regime $m \propto s \log^4 n$ or larger, the RIP-based bound applies, and provides better results than the RIPless bound.)

Next, a universal recovery guarantee, using an older approach based on the restricted isometry property (RIP) is described. This also relies on the isotropy and incoherence properties shown above.

First, the number of measurement settings is set as: $m \geq c_0 s \log^4 n$, (5.40) where s is the sparsity parameter, and co is some universal constant. (Note that m is slightly larger, by a poly(log n) factor, compared to the RIPless case.) Also, recall that D is the subspace of symmetric matrices whose diagonal elements are all 0 (see equation (5.10)), and $\Phi_D$ is the measurement operator restricted to act on this subspace.

In aspects, with high probability (over the random choice of $\Phi_D$), the normalized measurement operator $\Phi_D/\sqrt{m}$ satisfies the RIP (for sparsity level 2s). To see this, recall the isotropy and incoherence properties shown above. These properties imply that the measurement operator $\Phi_D$ is sampling at random from a "bounded orthonormal system." Such operators are known to satisfy the RIP, via a highly nontrivial proof.

From this point onwards, let the measurement operator $\Phi_D$ be fixed. $\Phi_D$ is capable of reconstructing the off-diagonal parts of all sparse matrices C, i.e., $\Phi_D$ can perform "universal" recovery.

As described above, let $C \in \mathbb{R}^{n \times n}$ be a correlation matrix, and let $C' \in D$ be its off-diagonal part (see equation (5.6)). Assume that C' is approximately s-sparse, i.e., there exists a matrix $C^{(s)} \in D$ that has at most s nonzero entries above the diagonal, and that approximates C' in the (vector) $\ell_1$ norm, up to an error of size $\eta_s$. This can be written compactly as: $\|uvec(C'-C^{(s)})\|_1 \leq \eta_s$, (Eq. 5.41)

where uvec(·) was defined in equation (5.11). (Recall that both C' and $C^{(s)}$ are symmetric, with all zeros on the diagonal. Hence it suffices to consider those matrix entries that lie above the diagonal.)

Measure g≈diag(C) and h≈Φ(C), and calculate h' (see equation (5.1)). Assume that the noise in the measurements of g and h is bounded by $\delta_1$ and $\delta_2$, as described in equations (3.19) and (3.23). Then solve the $\ell_1$-minimization problem in (5.12) and (5.13), setting the parameters $\epsilon_1$ and $\epsilon_2$ according to equations (3.21) and (3.25). Let $W^{(opt)}$ be the solution of this problem.

The following recovery guarantee, which shows that $W^{(opt)}$ provides a good approximation to C', in the Frobenius ($\ell_2$) norm, and in the $\ell_1$ vector norm. There is one subtle point: the convex optimization problem in equations (5.12) and (5.13) uses the unnormalized measurement operator $\Phi_D$, while the error bounds apply to the normalized measurement operator $\Phi_D/\sqrt{m}$. Hence, the noise is smaller by a factor of $\sqrt{m}$ in these error bounds.)

Theorem 2: With high probability (over the choice of the measurement operator Φ, with m set according to (Eq. 5.40)), for all correlation matrices C (satisfying the sparsity condition (Eq. 5.41)), the solution $W^{(opt)}$ satisfies the following error bounds:

$$\|W^{(opt)} - C'\|_F \leq c_1 \frac{\eta_s}{\sqrt{s}} + c_2\left(\frac{\epsilon_2}{\sqrt{m}} + \epsilon_1\sqrt{n}\right), \quad \text{(Eq. 5.42)}$$

$$\|W^{(opt)} - C'\|_{\ell_1} \leq c_1\eta_s + c_2\sqrt{s}\left(\frac{\epsilon_2}{\sqrt{m}} + \epsilon_1\sqrt{n}\right), \quad \text{(Eq. 5.43)}$$

where $c_1$ and $c_2$ are universal constants.

In these bounds, the first term upper-bounds the error that results from approximating C' by a sparse matrix, and the second term upper-bounds the error due to noise in the measurements of g and h.

In order to apply these bounds, one needs to know the values of $\epsilon_1$ and $\epsilon_2$. These can be obtained from equations (3.22) and (3.26):

$$\epsilon_1 \leq O(\delta_1 \|\text{diag}(C)\|_2), \quad \text{(Eq. 5.44)}$$

$$\epsilon_2 \leq O(\delta_2\sqrt{m}\|C\|_{\ell_1}). \quad \text{(Eq. 5.45)}$$

Also, it is useful to consider the special case where C' is exactly s-sparse, so $\eta_s=0$, and where as few measurement settings as possible are used, by setting m∝s $\log^4 n$. In this case:

$$\|W^{(opt)} - C'\|_F \quad \text{(Eq. 5.46)}$$

$$\leq O(\sqrt{n}\delta_1\|\text{diag}(C)\|_2 + \delta_2\|C\|_{\ell_1}) \quad \text{(Eq. 5.47)}$$

$$\leq O(\sqrt{n}\delta_1\|\text{diag}(C)\|_2 + \delta_2(\sqrt{n}\|\text{diag}(C)\|_2 + \sqrt{2s}\|C'\|_F)). \quad \text{(Eq. 5.48)}$$

This can be compared with the error bound (Eq. 2.31) for the naive method, and the RIPless error bound (Eq. 5.39) for compressed sensing. Generally speaking, compressed sensing has an advantage over the naive method when s is small, and the RIP-based bound has better scaling (as a function of n, s, diag(C) and C') than the RIPless bound, although it requires m to be slightly larger.

The performance of the disclosed compressed sensing method, for a typical measurement scenario is described below. Both the accuracy of the method, and the experimental resources required to implement it are considered. The asymptotic scaling of the disclosed method is described, and compared to the naive method, direct estimation of the correlation matrix.

Overall, the disclosed compressed sensing method has asymptotically better sample complexity, whenever the off-diagonal part of the correlation matrix C is sufficiently sparse. In particular, for a system of n qubits, the disclosed method is advantageous whenever the number of correlated pairs of qubits, s, is at most $O(n^{3/2})$ (ignoring log factors). These results are summarized in FIGS. 8A-8C.

Let C' be the off-diagonal part of the correlation matrix C 400, that is, C' is the matrix whose off-diagonal elements match those of C, and whose diagonal elements are zero. C' has at most s nonzero elements above the diagonal (and, by symmetry, at most s nonzero elements below the diagonal). The goal is to estimate both C' and diag(C).

Compressed sensing allows the possibility of adjusting the number of measurement settings, m, over a range from m∝s log n to m∝$n^2$. (Note that m∝s log n is just slightly above the information-theoretic lower bound, while m∝$n^2$ is the number of measurement settings used by the naive method.) Compressed sensing works across this whole range, but the error bounds vary depending on m. There are two cases: (1) For m∝s $\log^4 n$ or larger, both the RIP-based and RIPless error bounds are available, and the RIP-based error bounds are asymptotically stronger. (2) For m between m∝s log n and m∝s $\log^4 n$, only the RIPless error bound is available.

To make a fair comparison between compressed sensing and the naive method, the accuracy of these methods needs to be quantified in a consistent way. This is a nontrivial task, because the error bounds for the different methods have different dependencies on the parameters n, s, diag(C) and C'; this can be seen by comparing equation (2.31), and Theorems 1 and 2 as described herein.

A simple way of quantifying the accuracy of all of these methods may be used: given some δ>0, each method is required to return an estimate Ĉ' that satisfies $$\|\hat{C}' - C'\|_F \leq \delta \|C\|_F. \quad \text{(Eq. 6.1)}$$

The Frobenius matrix norm may be used, which is equivalent to the vector $\ell_2$ norm. C (rather than C') is written on the right hand side of the inequality, in order to allow the recovery error to depend on both the diagonal and the off-diagonal elements of C.

In addition, each method returns an estimate g of diag(C) that satisfies $$\|g - \text{diag}(C)\|_2 \leq \delta \|\text{diag}(C)\|_2. \quad \text{(Eq. 6.2)}$$

For both compressed sensing as well as the naive method, g is obtained in the same way, by performing single-qubit spectroscopy as in (2.19), and the error in g satisfies the same bound (Eq. 2.30).

The cost of implementing each method using real experiments should be accounted for. This cost depends on a number of factors. One factor is the total number of experiments that have to be performed, often called the sample complexity. This is the number of measurement settings, times the number of repetitions of the experiment with each measurement setting. Another factor is the difficulty of performing a single run of the experiment. This involves both the difficulty of preparing entangled states (random n-qubit GHZ states for the compressed sensing method, and 2-qubit Bell states for the naive method), and the length of time that one has to wait in order to observe dephasing.

An advanced quantum information processor is considered, where n-qubit GHZ states are fairly easy to prepare (using O(log n)-depth quantum circuits), and dephasing occurs at low rates, so that the main cost of running each experiment is the amount of time needed to observe dephasing. In this scenario, it is reasonable to use the sample complexity as a rough measure of the total cost of implementing the compressed sensing method, as well as the naive method.

In aspects, the sample complexity for three methods of interest may be calculated: (1) the naive method with $m \propto n^2$, (2) compressed sensing with $m \propto s \log^4 n$, and (3) compressed sensing with $m \propto s \log n$. This method (2) outperforms the naive method whenever $s \leq O(n^{3/2}/\log^2 n)$, and method (3) outperforms the naive method whenever $s \leq O(n^{2/3}/\log^2 n)$.

In addition, for each of these methods, the number of samples where single-qubit spectroscopy is performed, and the number of samples where multi-qubit spectroscopy is performed. (Recall that all of these methods use single-qubit spectroscopy to estimate the diagonal of C, and then use multi-qubit spectroscopy to estimate the off-diagonal part of C.) Both of these numbers can be important: multi-qubit spectroscopy is more expensive to implement on essentially all experimental platforms, and requires more samples when s is large; but it is possible for single-qubit spectroscopy to dominate the overall sample complexity, when s is small.

A naive method with $m \propto n^2$ is presented. Two parameters, $\delta_1$ and $\delta_2$, to quantify the accuracy of the measurements are used, as in equations (2.24) and (2.25). An estimate of C' is provided, whose error is bounded by equation (2.31): with probability at least $1-\eta$, $$\|\hat{C}' - C'\|_F^2 \leq \frac{1}{\eta}[3(n-1)(\delta_1 + \delta_2)^2 \|\text{diag}(C)\|_2^2 + 6\delta_2^2 \|C'\|_F^2]. \quad \text{(Eq. 6.3)}$$

For simplicity, $\eta$ is set to be some universal constant, for example, $\eta = 0.001$. Now, given any $\delta > 0$:

$$\|\hat{C}' - C'\|_F^2 \leq \delta^2 \|\text{diag}(C)\|_2^2 + (\delta^2/n)\|C'\|_F^2, \quad \text{(Eq. 6.4)}$$
$$\leq \delta^2 \|C\|_F^2$$

by setting $\delta_1 = \delta_2 = O(\delta/\sqrt{n})$. This satisfies the requirement (Eq. 6.1).

In addition, one can easily check that the estimate g for diag(C) satisfies the requirement (Eq. 6.2).

Then the sample complexity is as follows (see the discussion preceding (Eq. 2.24) and (Eq. 2.25)): the method performs single-qubit spectroscopy on $O(n/\delta_1^2) = O(n^2/\delta^2)$ samples, and multi-qubit spectroscopy on $O(n^2/\delta_2^2) = O(n^3/\delta^2)$ samples. Hence the total sample complexity is $O(n^3/\delta^2)$.

In aspects, compressed sensing may be performed with $m \propto s \log^4 n$. The solution $W^{(opt)}$ for the $\ell_1$-minimization problem in (Eq. 5.12) and (Eq. 5.13) satisfies the RIP-based bound in Theorem 2. Two parameters, $\delta_1$ and $\delta_2$, are used to quantify the accuracy of the measurements, as in equations (3.19) and (3.23).

The estimator $W^{(opt)}$ satisfies the following error bound (see Theorem 2, and equation (5.48)):

$$\|W^{(opt)} - C'\|_F \leq O(\sqrt{n}\delta_1 \|\text{diag}(C)\|_2 + \delta_2(\sqrt{n}\|\text{diag}(C)\|_2 + \sqrt{2s}\|C'\|_F)). \quad \text{(Eq. 6.5)}$$

Now, given any $\delta > 0$:

$$\|W^{(opt)} - C'\|_F \leq \frac{1}{\sqrt{2}}\delta \|\text{diag}(C)\|_2 + \frac{1}{\sqrt{2}}\delta \|C'\|_F, \quad \text{(Eq. 6.6)}$$
$$\leq \delta \|C\|_F$$

by setting $\delta_1 = O(\delta/\sqrt{n})$ and $\delta_2 = O(\delta/\sqrt{\max(n,s)})$. (Eq. 6.7)

This satisfies the requirement (Eq. 6.1). In addition, one can easily check that the estimate g for diag(C) satisfies the requirement (Eq. 6.2). Then the sample complexity is as follows (see the discussion following (Eq. 3.19) and (Eq. 3.23)): the method performs single-qubit spectroscopy on $O(n/\delta_1^2) = O(n^2/\delta^2)$ samples, and multi-qubit spectroscopy on $$O(m/\delta_2^2) \leq O(s \max(n,s) \log^4(n)/\delta^2) \quad \text{(Eq. 6.8)}$$ samples.
Hence the total sample complexity is at most $O(\max(n,s)^2 \log^4(n)/\delta^2)$. (Eq. 6.9)

This is less than the sample complexity of the naive method, provided the off-diagonal part of the correlation matrix is sufficiently sparse, i.e., when $s \leq O(n^{3/2}/\log^2 n)$.

In aspects, compressed sensing may be performed with $m \propto s \log n$. The LASSO optimization problem whose solution $W^{(opt)}$ satisfies the RIPless bound in Theorem 1. Two parameters, $\delta_1$ and $\delta_2$, are used to quantify the accuracy of the measurements, as in equations (3.19) and (3.23). In the following, the diagonal elements of C satisfy a bound of the form $$\|\text{diag}(C)\|_\infty \leq O\left(\frac{1}{\sqrt{n}} \|\text{diag}(C)\|_2\right). \quad \text{(Eq. 6.10)}$$

This assumption may be used to get a stronger error bound for $W^{(opt)}$. The assumption (Eq. 6.10) indicates that none of the diagonal elements $c_{jj}$ is too much larger than the others. This is plausible for a quantum system 100 that consists of many qubits that are constructed in a similar way.

In order to make this intuition more precise, (Eq. 6.10) may be written in an equivalent form:

$$\max_{1 \leq j \leq n} (c_{jj}^2) \leq O\left(\frac{1}{n}\sum_{j=1}^n c_{jj}^2\right), \quad \text{(Eq. 6.11)}$$

which indicates that the largest $c_{jj}^2$ is at most a constant factor larger than the average of all of the $c_{jj}^2$. Also, it is informative to consider how (Eq. 6.10) and (Eq. 6.11) compare to the (arguably more natural) assumption that $$\max_{1 \leq j \leq n} |c_{jj}| \leq O\left(\frac{1}{n}\sum_{j=1}^n |c_{jj}|\right). \quad \text{(Eq. 6.12)}$$

In fact, (Eq. 6.12) is actually a stronger assumption, in the sense that it implies (Eq. 6.10) and (Eq. 6.11), via the Cauchy-Schwarz inequality. The estimator $W^{(opt)}$ satisfies an error bound given by Theorem 1, and equation (5.39). Combining this with the assumption (Eq. 6.10):

$$\|W^{(opt)} - C'\|_F \leq O(s \log^{5/2}(n)[\delta_1 \sqrt{s \log(n)} \|\text{diag}(C)\|_2 + \delta_2 \sqrt{n}\|\text{diag}(C)\|_2 + \delta_2 \sqrt{2s}\|C'\|_F]). \quad \text{(Eq. 6.13)}$$

Now, given any $S > 0$, ensure that $$\|W^{(opt)} - C'\|_F \leq \frac{1}{\sqrt{2}} \delta \|\text{diag}(C)\|_2 + \frac{1}{\sqrt{2}}\delta\|C'\|_F, \quad \text{(Eq. 6.14)}$$
$$\leq \delta^2 \|C\|_F^2$$

by setting $\delta_1 = O\left(\frac{\delta}{s^{3/2} \log^3(n)}\right),$ (Eq. 6.15)

-continued $$\text{and } \delta_2 = O\left(\frac{\delta}{s\log^{5/2}(n)\sqrt{\max(n,s)}}\right). \quad \text{(Eq. 6.16)}$$

This satisfies the requirement (Eq. 6.1).

In addition, one can easily check that the estimate g for diag(C) satisfies the requirement (Eq. 6.2). Then the sample complexity is as follows (see the discussion following (3.19) and (3.23)). The disclosed method performs single-qubit spectroscopy on $O(n/\delta_1^2)=O(ns^3 \log^6(n)/\delta^2)$ (Eq. 6.17)

In aspects, the disclosed method further includes performing single-qubit spectroscopy samples, and multi-qubit spectroscopy on $O(m/\delta_2^2) \leq O(s^3 \max(n,s)\log^6(n)/\delta^2)$ (Eq. 6.18) samples. Hence the total sample complexity is at most $O(s^3 \max(n,s)\log^6(n)/\delta^2)$. (Eq. 6.19)

The total sample complexity is less than the sample complexity of the naive method, provided the off-diagonal part of the correlation matrix is sufficiently sparse, i.e., when $s \leq O(n^{2/3}/\log^2 n)$ Referring to FIGS. 9A and 9B, an evolution time t is chosen. During the physical implementation of the measurements of the correlation matrix C, decay rates $\Gamma_{ab}$ may be estimated. To do this, quantum states $|\psi_{ab}\rangle$ are prepared, allowing the quantum states to evolve for some time t, and then measure the quantum states in an appropriate basis. This works well when t is chosen appropriately, so that $\Gamma_{ab}t \sim 1$.

For example, one method of estimating the decay rate may use an evolution time t such that $$\frac{1}{2} \leq \Gamma_{ab}t \leq 2.$$

An initial guess for t ($\tau_0$) is made. Next, a "binary search" is performed. The binary search includes running a sequence of experiments, where one observes the dephasing of the state $|\psi_{ab}\rangle$ for some time t, and after each experiment, one adjusts the time t adaptively, multiplying and dividing by factors of 2, in order to get the "right amount" of dephasing. Generally, the sequence of experiments is about $\sim |\log(\Gamma_{ab}\tau_0)|$ experiments. More precisely, the following procedure may be performed:

1. Fix some $\tau_0 > 0$; as the initial guess for the evolution time t.
2. For $r=1, 2, \ldots, N_{trials}$, perform the following: ($N_{trials}$ are set according to equation (7.9) below)
   (a) Set $s_0=0$ and $t_0=2^{s_0}\tau_0$ (as the initial guess for t).
   (b) For $j=0,1,2, \ldots, N_{steps}-1$, do the following: ($N_{steps}$ are set according to equation (7.5) below)
   i. Prepare the state $$|\psi_{ab}\rangle = \frac{1}{\sqrt{2}}(|a\rangle + |b\rangle),$$

allow the state to dephase for time then measure in the basis $$\frac{1}{\sqrt{2}}(|a\rangle \pm |b\rangle)$$

ii. If the measurement returns $$\frac{1}{\sqrt{2}}(|a\rangle + |b\rangle),$$

then set $$s_{j+1} = \begin{cases} s_{j+1} \text{ with probability } \frac{e-1}{e+1}, \\ s_j \text{ otherwise.} \end{cases} \quad \text{(Eq. 7.1)}$$

If the measurement returns $$\frac{1}{\sqrt{2}}(|a\rangle - |b\rangle),$$

then set $s_{j+1}=s_j-1$.
   iii. Set $t_{j+1}=2^{s_{j+1}}\tau_0$. (This is the next guess for t.)
   (c) Define $\tau_r$ to be the value of $s_j$ from the last iteration of the loop, that is, $\xi_r = s_{N_{steps}}$.
3. Compute the average $$\xi = \frac{1}{N_{trials}} \sum_{r=1}^{N_{trials}} \xi_r.$$

Return $\hat{t}=2^{s_6} \tau_0$. (This is the estimate for t.)

This procedure can be described intuitively as follows. The inner loop of this procedure (the loop indexed by j) can be viewed as a kind of stochastic gradient descent, which behaves like a random walk on real numbers of the form $t=2^s \tau_0$ ($s \in \mathbb{Z}$) (see the dashed curves in FIG. 9A).

In aspects, this random walk has a single basin of attraction at a point $t^*=2^{s^*}\tau_0$ that satisfies $\Gamma_{ab}t^* \approx 1$, that is, $s^* \approx -\log_2(\Gamma_{ab}\tau_0)$ The random walk converges to this point: with high probability, the sequence $s_0, s_1, s_2, \ldots$ will reach the point $s^*$ after $O(|s^*|)=O(|\log(\Gamma_{ab}\tau_0)|)$ steps; after that point, the sequence will remain concentrated around $s^*$, with exponentially-decaying tail probabilities (see FIG. 9B). This claim is made precise in equations (7.5) and (7.6).

Finally, the outer loop of this procedure (the loop indexed by r) computes an estimate $\xi$ of $s^*$, by averaging over several independent trials (see the solid curves in FIG. 9A). This then yields an estimate $\hat{t}$ of $t^*$. The required number of trials, and the accuracy of the resulting estimate $\hat{t}$, are analyzed in equations (7.9) and (7.10).

Referring to FIGS. 9A and 9B, plots illustrating the evolution time t are shown. FIG. 9A shows the trajectories of the random walk. Start with an initial guess $\tau_0$, that can either be shorter or longer than the optimal time. The evolution time is then stochastically halved or doubled over $N_{steps}$ iterations, according to the algorithm described herein. This procedure is repeated (dashed curves) and the outcome is averaged (solid curves) to obtain an estimate $\hat{t}$. The region in which $$\frac{1}{2} < \Gamma_{ab}\hat{t} < 2$$

is shaded in green. FIG. 9B illustrates the accuracy of the final estimate $\hat{t}$, as a function of the number of steps $N_{steps}$ and the starting point $\tau_0$. The green shading shows the region where $\hat{t}$ satisfies the bound $$\frac{1}{2} < \Gamma_{ab}\hat{t} < 2.$$

At the boundary of the green region, $N_{steps}$ scales logarithmically with $|\Gamma_{ab}\tau_0|$, as predicted by Eq. (7.5).

To choose t the random walk may be used. The variables $s_j$, which are related to the $t_j$ via the identity $t_j=2^{s_j}\tau_0$. It is easy to see that $s_0=0$, $s_{j+1} \in \{s_j, s_j-1, s_j+1\}$, and $$\mathbb{E}[s_{j+1}|s_j] = s_j + \frac{1}{2}(1 + e^{-\Gamma_{ab}t_j})\frac{e-1}{e+1} - \frac{1}{2}(1 - e^{-\Gamma_{ab}t_j}) \quad \text{(Eq. 7.2)}$$

$$= s_j + \frac{1}{e+1}(e^{1-\Gamma_{ab}t_j} - 1).$$

Hence the sequence $s_0, s_1, s_2, \ldots$ can be viewed as the trajectory of a random walk on a 1-dimensional chain, beginning at $s_0$, with transition probabilities that vary along the chain. The expected behavior of the random walk can be bounded as follows:

$$\mathbb{E}[s_{j+1}|s_j] \begin{cases} \geq s_j + \mu & \text{when } \Gamma_{ab}t_j \leq \frac{1}{\sqrt{2}}, \\ \leq s_j - \mu & \text{when } \Gamma_{ab}t_j \geq \sqrt{2}, \\ \approx s_j + \frac{e-1}{e+1} & \text{when } \Gamma_{ab}t_j \ll 1, \\ \approx s_j - \frac{1}{e+1} & \text{when } \Gamma_{ab}t_j \gg 1, \end{cases} \quad \text{(Eq. 7.3)}$$

where $\mu$ is a numerical constant, $$\mu = 0.09. \quad \text{(Eq. 7.4)}$$

Hence the random walk will tend to converge towards some integer $s^*$ such that $t^*=2^{s^*}\tau_0$ satisfies $$\frac{1}{\sqrt{2}} \leq \Gamma_{ab}t^* \leq \sqrt{2}.$$

Note that the expected position of the random walk moves towards $s^*$ at a rate that is lower-bounded by $\mu$. So, in order to go from $s_0=0$ to $s^* \approx -\log_2(\Gamma_{ab}\tau_0)$, the random walk will take roughly $$\frac{1}{\mu}|s^*| = \frac{1}{\mu}|\log_2(\Gamma_{ab}\tau_0)|$$

steps. It is easy to see that the stationary distribution of the random walk is centered around $s^*$, with exponentially decaying tails; hence, once the walk reaches $s^*$, it will remain concentrated around that point.

Set the parameter $N_{steps}$ so that, with high probability, after $N_{steps}$ steps, the random walk will converge. Given an upper bound h on the magnitude of $s^*$, i.e., $|s^*| \leq h$, or equivalently $2^{-h} \leq \Gamma_{ab}\tau_0 \leq 2^h$. The random walk may be performed for a number of steps $$N_{steps} = \frac{h}{\mu} + \eta, \quad \text{(Eq. 7.5)}$$

where $\eta \geq 0$. Here, $$\frac{h}{\mu}$$

is (an upper bound on) the expected number of steps needed to reach $s^*$. Take an additional $\eta$ steps to ensure that the walk does indeed reach $s^*$ with high probability (the probability of failure decreases exponentially with $\eta$).

After $N_{steps}$ steps, the final position of the walk is close to $s^*$, with exponentially decaying tail probabilities: for any $\ell \geq 1$, $$Pr[|s_{N_{steps}} - s^*| \geq \ell | s_0 = 0] \leq \quad \text{(Eq. 7.6)}$$

$$\frac{16}{\mu^2}\exp\left(-\frac{\mu(\mu+1)}{8}\ell + \frac{\mu^2}{4}\right) + 2\exp\left(-\frac{\mu}{16}\min\left\{\frac{\mu\eta}{h}, 1\right\}(\ell + \mu\eta)\right).$$

In particular, when $$\eta \geq \frac{h}{\mu},$$

this bound can be slightly simplified:

$$Pr[|s_{N_{steps}} - s^*| \geq \ell | s_0 = 0] \leq \quad \text{(Eq. 7.7)}$$

$$\frac{16}{\mu^2}\exp\left(-\frac{\mu(\mu+1)}{8}\ell + \frac{\mu^2}{4}\right) + 2\exp\left(-\frac{\mu}{16}(\ell + \mu\eta)\right).$$

The bound (Eq. 7.6) is proved using martingale techniques.

In aspects, the parameter $N_{trials}$ may be set, and an error bound on the estimator $\hat{t}$ may be derived. The bound (Eq. 7.6) implies that the random variables $\xi_r = s_{N_{steps}}$ are sub-exponential, and their sub-exponential norms are bounded by some constant $\|\xi_r\|_{\psi_1} \leq K$. Hence their average $\xi$ satisfies a Bernstein-type concentration inequality: for every $\delta \geq 0$, $$Pr[|\xi - s^*| \geq \delta] \leq 2\exp\left(-c\min\left\{\frac{\delta^2}{K^2}, \frac{\delta}{K}\right\}N_{trials}\right), \quad \text{(Eq. 7.8)}$$

where $c>0$ is a universal constant.

Now, for any $\epsilon>0$, set $$N_{trials} = \frac{1}{c}\max\left\{\frac{K}{\delta}, \frac{K^2}{\delta^2}\right\}\log\left(\frac{2}{\epsilon}\right). \quad \text{(Eq. 7.9)}$$

The following error bound on the estimator $\hat{t}=2^\xi\tau_0$: with probability $\geq 1-\epsilon$, provides $|\xi - s^*| < \delta$, which implies that $$2^{-0.5-\delta} \leq \Gamma_{ab}\sqrt{\hat{t}} < 2^{0.5\alpha\delta}, \quad \text{(Eq. 7.10)}$$

Assuming $\delta < \frac{1}{2}$, this implies that $$\frac{1}{2} < \Gamma_{ab}\hat{t} < 2,$$

as desired.

When the disclosed measurement protocols are implemented in an experiment, errors may occur during state preparation and measurement (SPAM errors). The effect of these errors on estimating the decay rates $\Gamma_{ab}$ may be investigated. Let $\rho_0$ and $E_0$ denote the noiseless initial state and observable of interest, respectively.

$$\rho_0 = E_0 = \frac{1}{2}(|a\rangle\langle a| + |b\rangle\langle b| + |b\rangle\langle a| + |a\rangle\langle b|). \quad (8.1)$$

Error channels $\varepsilon_s$ and $\varepsilon_m$ that act on state preparation and measurement operations may be considered as:

$$\tilde{\rho} = \varepsilon_s(\rho_0) = \rho_0 + \delta\rho \quad \text{(Eq. 8.2)}$$

$$\tilde{E} = \varepsilon_m(E_0) = E_0 + \delta E, \quad \text{(Eq. 8.3)}$$

where $\|\delta\rho\|_n \leq \epsilon_s$ and $\|\delta E\| \leq \epsilon_m$, and $\epsilon_s$ and $\epsilon_m$ are small parameters. The outcome of the protocol is now given by $$\tilde{P}_{ab}(t) = Tr[\tilde{E}\varepsilon_t(\tilde{\rho})], \quad \text{(Eq. 8.4)}$$

where $\varepsilon_t = \exp(\mathcal{L} t)$ is the evolution under the correlated dephasing noise (1.1).

The protocol is robust against these kinds of errors, and for short times t the decay of $\tilde{P}ab(t)$ is still dominated by $\Gamma_{ab}$. Using Eqs. (8.2) and (8.3):

$$Tr[\tilde{E}\varepsilon_t(\tilde{\rho})] = Tr[E_0\varepsilon_t(\rho_0)] \quad \text{(Eq. 8.5)}$$

$$+ Tr[E_0\varepsilon_t(\delta\rho)] + Tr[\delta E\varepsilon_t(\rho_0)]$$

$$+ Tr[\delta E\varepsilon_t(\delta\rho)]$$

The first term is the outcome without errors:

$$Tr[E_0\varepsilon_t(\rho_0)] = \frac{1 + e^{-t\Gamma_{ab}}}{2}. \quad \text{(Eq. 8.6)}$$

Find the effect of errors on the second and third terms, by considering the effect of $\varepsilon_t$ on $\rho_1$ and $E_1$. Specifically:

$$Tr[E_0\varepsilon_t(\delta\rho)] = \eta_s + \zeta_s e^{-\Gamma_{ab}t}, \quad \text{(Eq. 8.7)}$$

$$Tr[\delta E\varepsilon_t(\rho_0)] = \eta_m + \zeta_m e^{-\Gamma_{ab}}, \quad \text{(Eq. 8.8)}$$

where $\eta_{s,m}$ and $\zeta_{s,m}$ are constants that are determined by $\delta\rho$ and $\delta E$, for s and m, respectively. Therefore, these terms decay at the same rate as the first case and do not affect the exponential decay. However, the last term can, in principle, contain different decay rates and can cause deviation from a single exponential decay. Bound the rate at which $R(t)=Tr[\delta E\varepsilon_t(\delta\rho)]$ grows:

$$|\dot{R}(t)| = \left|\frac{\partial}{\partial t} Tr[\delta E \varepsilon_c(\delta\rho)]\right| \quad \text{(Eq. 8.9)}$$

$$= |Tr[\delta E \mathcal{L}(\delta\rho)]| \quad \text{(Eq. 8.10)}$$

$$\leq 2\epsilon_m \epsilon_s (n+s), \quad \text{(Eq. 8.11)}$$

Therefore:

$$\tilde{P}_{ab}(t) = \frac{1}{2}\left(1 + \eta_s + \eta_m + (1 + \zeta_s + \zeta_m)e^{-\Gamma_{ab}t}\right) + R(t), \quad \text{(Eq. 8.12)}$$

The deviations from a single exponential decay are attributed to R(t). Using Eqs. (8.11) and (8.12) the decay rate of $\tilde{P}_{ab}(t)$ is dominated by $\Gamma_{ab}$ for evolution times $t \lesssim 1/(2\epsilon_s\epsilon_m(n+s))^{-1}$.

Referring to FIGS. 10A-10C, graphs illustrating the exponential decay of $\tilde{P}_{ab}(t)$ when there are SPAM errors is shown. The decay of a 3-qubit GHZ state is simulated. A correlation matrix C is selected with uniform single-qubit dephasing rate ($c_{ii}=\gamma_0$) and nearest-neighbor correlations $c_{i,i\pm1}=\gamma_0/4$. FIGS. 10A-10C show the decay of $\tilde{P}_{ab}(t)$ under different noise strengths: (FIG. 10A) $\Delta=0.01$, (FIG. 10B) $\Delta=0.05$, (FIG. 10C) $\Delta=0.1$. The dashed lines show the decay with no SPAM errors, and solid lines show the decay with SPAM errors from randomly-sampled error channels. The solid lines resemble the dashed lines for short evolution times t.

Numerical simulations may be used to investigate the effect of SPAM errors on estimates of the decay rate $\Gamma_{ab}$. Simulate SPAM errors by applying random error channels $\varepsilon_s$ and $\varepsilon_m$, whose strengths are controlled by a parameter $\Delta$. Compare the decay of $\tilde{P}_{ab}(t)$ with and without SPAM errors, for different values of $\Delta$. Observe that, for short times t, the decay with SPAM errors matches the decay without SPAM errors, i.e., the decay rate is dominated by $\Gamma_{ab}$, see FIGS. 10A-10C. This is consistent with the theoretical analysis.

The disclosed method for learning sparse correlated dephasing noise (FIGS. 3 and 4) can be extended to the most general case of the master equation (1.1), where the matrix C is complex, and there is an additional Hamiltonian term $H_s$.

In aspects, the decay rates may be complex. The complete dynamics imposed by the environment on the quantum system 100 can have a coherent evolution in addition to the decay. The evolution of the quantum system $$100\frac{d\rho}{dt} = \mathcal{L}(\rho)$$

is in general given by the Lindblad generator $$\mathcal{L}(\rho) = -i[\rho, H_s] + \sum_{l,m} c_{lm}\left(Z_l \rho Z_m - \frac{1}{2}\{Z_l Z_m, \rho\}\right), \quad \text{(Eq. 9.1)}$$

$$\text{where } H_s = \sum_{l,m} r_{lm} Z_l Z_m \quad \text{(Eq. 9.2)}$$

is sometimes called the (generalized) Lamb shift Hamiltonian, and $C=(c_{lm})$ is now a complex matrix. Matrix C may be decomposed as $C=V+iT$, (Eq. 9.3) where the real and imaginary parts are separated into $V=(v_{lm})$, a real symmetric matrix, and $T=(t_{lm})$, a real skew-symmetric matrix, respectively. Moreover, the Lamb shift Hamiltonian can be encoded in the symmetric matrix $R=(r_{lm})$.

In aspects, the operator $\mathcal{L}$ acts on the off-diagonal matrix elements $|a\rangle\langle b|$. This involves "decay rates" that depend on R, V and T in a simple way, although these "decay rates" are now complex rather than real. Specifically, $$\mathcal{L}(|a\rangle\langle b|) = (-\Gamma_{ab} + i\Omega_{ab})|a\rangle\langle b|, \quad \text{(Eq. 9.4)}$$

where $\Gamma_{ab}$ and $\Omega_{ab}$ are real numbers that capture the decay and oscillations of the matrix element, respectively. The convention is defined for states $|a\rangle$ and $|b\rangle : Z_i|a\rangle = \alpha_i|a\rangle$, and similarly for $|b\rangle$ and $\beta_i$. Therefore, separating the real and imaginary parts of $\mathcal{L}(|a\rangle\langle b|)$ it is found that:

$$\Gamma_{ab} = -\sum_{l,m} v_{lm}\left(\alpha_l \beta_m - \frac{1}{2}\alpha_l\alpha_m - \frac{1}{2}\beta_l\beta_m\right) = \frac{1}{2}(\alpha-\beta)^T V(\alpha-\beta), \quad (9.5)$$

The fact that V is symmetric can be used. Similarly:

$$\Omega_{ab} = \quad \text{(Eq. 9.6)}$$
$$-\sum_{l,m} r_{lm}(\alpha_l\alpha_m - \beta_l\beta_m) + \sum_{l,m} v_{lm}\left(\alpha_l\beta_m - \frac{1}{2}\alpha_l\alpha_m - \frac{1}{2}\beta_l\beta_m\right) =$$
$$-(\alpha^T R\alpha - \beta^T R\beta) + \frac{1}{2}(\alpha^T T\beta - \beta^T T\alpha).$$

R and T, are symmetric and skew-symmetric matrices, respectively. Therefore, the coherences, that is, the |a⟩⟨b| elements of the density matrix ρ(t), exhibit both oscillations (at a frequency $\Omega_{ab}$) and exponential decay (at a rate $\Gamma_{ab}$) as a function of t. Note that it is possible to measure both $\Gamma_{ab}$ and $\Omega_{ab}$, by estimating the matrix elements of ρ(t) at different times t, using the same types of Ramsey experiments described herein. In particular, one can extract these parameters using standard techniques for analyzing spectral lines in atomic physics. Here, the squared magnitude of the Fourier transform of the measurement time series is a Lorentzian function, the center of the Lorentzian peak provides the oscillation frequency, and the width of the peak provides the decay rate.

Given estimates of $\Gamma_{ab}$ and $\Omega_{ab}$, the compressed sensing method can be extended to recover both the correlation matrix C 400 (FIG. 6) and the Hamiltonian $H_s$. As before, m~s log n or m~s log$^4$n can be used for measurement settings. For each measurement setting, a and b are chosen uniformly at random in {0,1}11. From estimates of $\Gamma_{ab}$, V can be recovered, the real part of C, exactly as before. In a similar manner, given estimates of $\Omega_{ab}$, T may be recovered, the imaginary part of C, as well as R, the matrix that encodes the Hamiltonian $H_s$. This is possible, because the equation represents a measurement of R and T that has the needed isotropy and incoherence properties.

In aspects, isotropy and incoherence of the Measurements $\Omega_{ab}$ may be determined.

$\Omega_{ab}$, viewed as a measurement of R and T, with a and b chosen uniformly at random in {0,1}$^n$. This random measurement has the same isotropy and incoherence properties as before, and hence the compressed sensing method will still succeed using these measurements. The incoherence property is easy to see, but some work is required to show the isotropy property.

The measurement $\Omega_{ab}$ acts on T and R as $$\Omega_{ab} = [\alpha^T \ \beta^T]\begin{bmatrix} -R & \frac{1}{2}T \\ -\frac{1}{2}T & R \end{bmatrix}\begin{bmatrix} \alpha \\ \beta \end{bmatrix}. \quad (Eq. 9.7)$$

It is advantageous to consider the effect of measurements if the symmetries of R and T are enforced. Note that T and R are real skew-symmetric and symmetric matrices, respectively. Moreover, they are both traceless. Therefore:

$$\Omega_{ab}\Sigma_{i<j}(\alpha_i\beta_j - \beta_i\alpha_j)T_{ij} + 2\Sigma_{i<j}(\alpha_i\alpha_j - \beta_i\beta_j)R_{ij}) \quad (Eq. 9.8)$$

As before, let uvec be the linear operator that returns the upper-triangular part of a matrix (not including the diagonal elements), that is, uvec: R ↦ $(R_{ij})_{i<j}$. (Eq. 9.9)

Then $\Omega_{ab}$ can be expressed as $$\Omega_{ab} = q\begin{bmatrix} uvec(T) \\ 2uvec(R) \end{bmatrix}, \quad (Eq. 9.10)$$

similar to Eq. (5.26), where q is a row vector of the form $$q=[\text{uvec}(\alpha\beta^T - \beta\alpha^T), \text{uvec}(\alpha\alpha^T - \beta\beta^T)]. \quad (Eq. 9.11)$$

Note that as described above, α and β are chosen uniformly and independently at random from {1,−1}$^n$. It is then straightforward to see that q in this case satisfies the incoherence property (Eq. 5.30) with μ=1. Furthermore, one can check that q is centered and isotropic (up to a normalization factor of √2), since:

$$\begin{cases} \mathbb{E}[\alpha_i\alpha_j] = \mathbb{E}[\alpha_i\beta_j] = \mathbb{E}[\beta_i\beta_j] = 0 \\ \mathbb{E}[(\alpha_i\beta_j - \beta_i\alpha_j)(\alpha_k\beta_l - \beta_k\alpha_l)] = 2\delta_{ik}\delta_{jl} \\ \mathbb{E}[(\alpha_i\alpha_j - \beta_i\beta_j)(\alpha_k\alpha_l - \beta_k\beta_l)] = 2\delta_{ik}\delta_{jl} \\ \mathbb{E}[(\alpha_i\beta_j - \beta_i\alpha_j)(\alpha_k\alpha_l - \beta_k\beta_l)] = 0 \end{cases} \quad (9.12)$$

where it is assumed that i<j and k<l in all cases. The second and the third lines in the above equation capture the correlations in the measurements of T and R, respectively, and the last line captures the cross-correlations between the two measurements.

Figure 11:
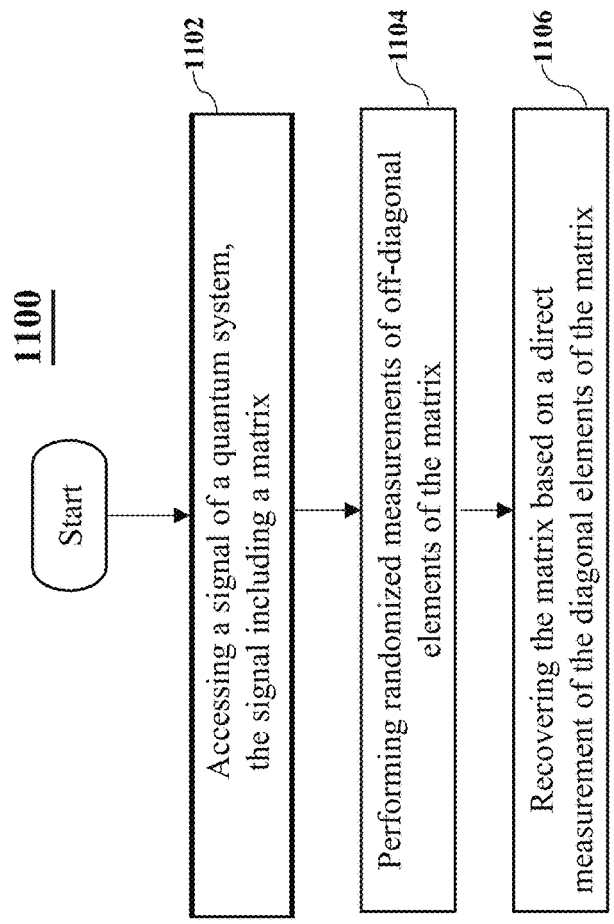
FIG. 11 illustrates a flow diagram of the computer-implemented method for determining a two-qubit correlated dephasing error for the quantum system, such as the quantum system of FIG. 1, in accordance with examples of the present disclosure.

FIG. 11 illustrates a flow diagram of the computer-implemented method 1100 for determining a two-qubit correlated dephasing error for the quantum system 100, such as the quantum system of FIG. 1. It is contemplated that the performance of the order of the steps of FIG. 11 may be changed. The steps of method 1100 may be performed by a processor.

Initially, at step 1102, a signal of a quantum system 100 is accessed. The signal includes a plurality of qubits 102 (FIG. 1). Every qubit has a nonzero dephasing rate. The signal includes information regarding a matrix (e.g., matrix C 400). The matrix includes diagonal elements and off-diagonal elements (FIG. 6). The off-diagonal elements of the matrix are 2s-sparse.

Next, at step 1104, randomized measurements of the off-diagonal elements of the matrix are performed. The randomized measurements may include preparing entangled GHZ states on random subsets of the plurality of qubits 102. The randomized measurements may be based on noise spectroscopy and quantum sensing.

Next, at step 1106, the matrix is recovered based on a direct measurement of the diagonal elements of the matrix. The recovered matrix may include a restricted isometry property.

In aspects, a two-qubit correlated dephasing error may be estimated based on the recovered matrix. In another aspect, a long-range correlated dephasing error may be detected based on the recovered matrix.

In aspects, a decay rate may be collected in a vector. The recovered matrix may be further based on the estimated decay rate. A relaxation time and/or decoherence time of the quantum system 100 may be estimated based on the estimated decay rate.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different example embodiments provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A computer-implemented method for detecting a two-qubit correlated dephasing error, the method comprising:
    accessing a signal of a quantum device, the quantum device including a plurality of qubits, wherein every qubit has a nonzero rate of dephasing, wherein some qubits have a nonzero rate of correlated dephasing, wherein the signal includes information about a matrix, the matrix including diagonal elements and off-diagonal elements, and wherein the off-diagonal elements of the matrix are 2s-sparse;
    performing randomized measurements of the off-diagonal elements of the matrix by preparing entangled Greenberger-Horne-Zeilinger states (GHZ states) on random subsets of the plurality of qubits;
    recovering the matrix based on a direct measurement of the diagonal elements of the matrix; and
    estimating a two-qubit correlated dephasing error based on the recovered matrix.

2. The computer-implemented method of claim 1, wherein the randomized measurements are based on noise spectroscopy and quantum sensing.

3. The computer-implemented method of claim 1, wherein the recovered matrix includes a restricted isometry property.

4. The computer-implemented method of claim 1, further comprising estimating a vector of decay rates that are dependent on the matrix.

5. The computer-implemented method of claim 4, wherein the recovered matrix is further based on the estimated decay rate.

6. The computer-implemented method of claim 4, further comprising estimating a relaxation time of the quantum device based on the estimated vector of decay rates.

7. The computer-implemented method of claim 4, further comprising estimating a decoherence time of the quantum device based on the estimated vector of decay rates.

8. The computer-implemented method of claim 1, further comprising detecting a long-range correlated dephasing error based on the recovered matrix.

9. A computer-implemented method for detecting a two-qubit correlated dephasing error, the method comprising:
    accessing a signal of a quantum device, the quantum device including a plurality of qubits, wherein every qubit of the plurality of qubits has a nonzero rate of dephasing and wherein some qubits have a nonzero rate of correlated dephasing;
    dephasing entangled states of the plurality of qubits based on performing Ramsey spectroscopy using entangled states of random subsets of qubits of the plurality of qubits;
    measuring a linear function of a correlation matrix, where the correlation matrix corresponds to correlated Markovian dephasing between pairs of qubits of the plurality of qubits;
    generating a first vector and a second vector, wherein a plurality of elements of the first vector and of the second vector are randomly chosen; and
    estimating a decay rate based on the first vector and the second vector.

10. The computer-implemented method of claim 9, further comprising generating a restricted isometry property-based recovery matrix, wherein the recovery matrix is further based on the estimated decay rate.

11. The computer-implemented method of claim 10, further comprising detecting a long-range correlated dephasing error based on the recovery matrix.

12. The computer-implemented method of claim 9, further comprising estimating a relaxation time of the quantum device based on the estimated decay rate.

13. The computer-implemented method of claim 9, further comprising estimating a decoherence time of the quantum device based on the estimated decay rate.

14. A system for detecting a two-qubit correlated dephasing error, the system comprising:
    a processor; and
    a memory, including instructions stored thereon, which when executed by the processor, cause the system to:
        access a signal of a quantum device, the signal including a plurality of qubits, wherein every qubit has a nonzero dephasing rate;
        generate a matrix C in $R^{n \times n}$, wherein its off-diagonal part is 2s sparse and wherein the matrix C is based on the accessed signal; and
        detect a long-range correlated dephasing error based on the generated matrix C.

15. The system of claim 14, wherein the instructions, when executed by the processor, further cause the system to:
    perform randomized measurements based on:
        estimating $(b-a)^T C(b-a)$ for any $a \neq b$ in $\{0,1\}n$;
        choosing a sequence of random vectors $r(1), \ldots, r(m)$ in $\{1, 0, -1\}n$; and
        estimating $\Phi C = (r^{(1)^T} Cr^{(1)}), \ldots, (r^{(m)^T} Cr^{(m)})$, where $\Phi: R^{n \times n} \to R^m$.

16. The system of claim 15, wherein the instructions, when executed by the processor, further cause the system to:
    estimate a decay rate $\delta_{ab}$ based on any $a \neq b$ in $\{0,1\}^n$; and estimate a decoherence time of the quantum device based on the decay rate $\Gamma_{ab}$.

17. The system of claim 16, wherein the instructions, when executed by the processor, further cause the system to:
recover Matrix C based on:
   measuring a plurality of diagonal elements of matrix C directly; and
   determining an off-diagonal element of matrix C based on using $\ell_1$-regularized least-squares regression.

\* \* \* \* \*